United States Patent
Rao et al.

(10) Patent No.: US 7,561,951 B2
(45) Date of Patent: Jul. 14, 2009

(54) OCCUPANT CONTROL SYSTEM INTEGRATED WITH VEHICLE DYNAMICS CONTROLS

(75) Inventors: Manoharprasad K. Rao, Novi, MI (US); Jianbo Lu, Livonia, MI (US); Joseph C. Meyers, Farmington Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 145 days.

(21) Appl. No.: 10/908,310

(22) Filed: May 6, 2005

(65) Prior Publication Data

US 2006/0253240 A1 Nov. 9, 2006

(51) Int. Cl.
*G06F 7/00* (2006.01)

(52) U.S. Cl. ............... 701/48; 701/1; 701/29; 701/36; 701/45; 340/438; 180/268

(58) Field of Classification Search ...... 701/1, 701/29, 34, 36, 45, 48, 301; 340/435, 438, 340/439; 180/268, 271, 272, 273
See application file for complete search history.

(56) References Cited

U.S. PATENT DOCUMENTS

| | | | |
|---|---|---|---|
| 5,983,161 A | 11/1999 | Lemelson et al. | |
| 6,370,461 B1 | 4/2002 | Pierce et al. | |
| 6,519,519 B1 | 2/2003 | Stopczynski | |
| 2002/0014767 A1 | 2/2002 | Class et al. | |
| 2003/0009270 A1 | 1/2003 | Breed | |
| 2006/0109094 A1* | 5/2006 | Prakah-Asante et al. | .... 340/435 |
| 2006/0208169 A1* | 9/2006 | Breed et al. | ................. 250/221 |

* cited by examiner

*Primary Examiner*—Gertrude Arthur Jeanglaud
(74) *Attorney, Agent, or Firm*—Frank MacKenzie

(57) ABSTRACT

A control system for an automotive vehicle that includes a plurality of dynamics sensors (14) for generating a plurality of dynamic condition signals and also a plurality of environment sensors (16) for generating a plurality of environment signals is provided herein. Vehicle systems such as a driver warning system, a powertrain control module, a restraint control module, and a chassis control module are also provided. A controller (12) is coupled to the plurality of sensors and classifies the operation of the vehicle as controllable stable, controllable unstable, or uncontrollable in response to the plurality of dynamic condition signals and the plurality of environment signals. The controller (12) selects a level of control for the vehicle systems in response to classifying. The level of control is different in response to the respective classification.

34 Claims, 10 Drawing Sheets

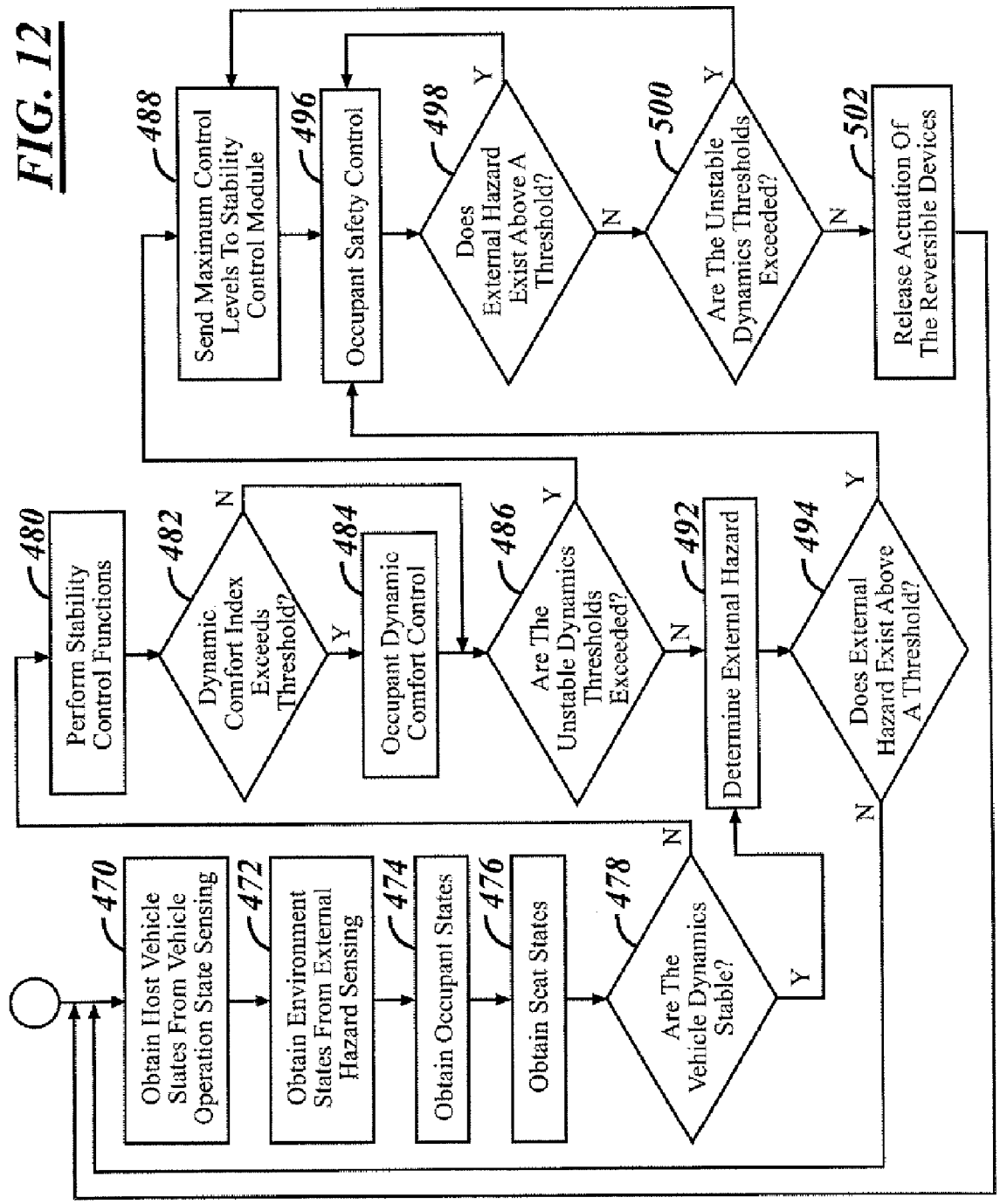

OCCUPANT CONTROL SYSTEM INTEGRATED WITH VEHICLE DYNAMICS CONTROLS

TECHNICAL FIELD

The present invention relates generally to vehicle dynamic systems for automotive vehicles and more specifically to the integration of a vehicle dynamic system with other safety systems of a vehicle.

BACKGROUND

Many vehicles such as sport utility vehicles (SUVs) and light trucks are being equipped with vehicle dynamic control and safety features such as roll stability control (RSC), yaw stability control, and vehicle rollover protection systems. Many advanced sensing and occupant protection systems such as pre-crash sensing systems, motorized seatbelt pretensioners, and dynamic suspension height adjustment systems are also being deployed or developed. Currently, these systems operate as independent features or functions without realizing the synergistic benefits and both the system simplification and cost-saving opportunities that can be made available from an integrated systems approach.

It would therefore be desirable to provide a system that integrates various vehicle systems so that cost savings can be achieved and, at the same time, the overall vehicle system performance can be improved, or at least not compromised, by means of a more thorough determination of control conditions and crash conditions.

One specific example mentioned above is a vehicle that is equipped with various active safety systems including roll stability control, yaw stability control, collision mitigation systems, and various passive safety deployment and control devices including seatbelt pretensioners and various air bags. The seatbelt pretensioners may be electronically controlled (for example, motorized). One example of a pretensioner is set forth in U.S. Pat. No. 6,574,540.

U.S. Pat. No. 6,574,540 describes a vehicle collision damage reduction system. The system works by detecting the relative speed between the host vehicle and an object, and calculating a danger level based on the relative speed and relative distance. Based on the danger level, a pretensioner can be activated at a certain level. No rollover stability control and the other vehicle dynamics based activation are conducted.

U.S. Publication 2003/0047927 describes a rollover detection means and also restraint means, such as belt tighteners, that are triggered upon the detection of a rollover. U.S. Pat. No. 6,650,981 also proposes a method for controlling a vehicle occupant protecting device upon detection of a rollover.

PCT Publication WO/2003/051686 A1 describes a seatbelt device control method including an obstacle detection, a collision detection, and a pretensioner control that is activated when a collision is predicted. No rollover, stability control and the other vehicle dynamics based activation are conducted.

U.S. Pat. No. 6,256,565 describes a safety system, which operates on the basis of an obstacle detection device and vehicle state detection device for the control of an inflatable seatbelt system. No rollover, stability control and the other vehicle dynamics based activation are conducted.

PCT Publication WO/2003/078181 A1 describes a method that controls a reversible system associated with a seat (especially a belt tensioner) based on the detection of a rapid pressure drop in a tire. Such a system secures a passenger to the seat in the potentially dangerous situation of a tire blowout. No rollover, stability control and the other vehicle dynamics based activation are conducted.

U.S. Publication 2002/0087243 addresses a control system in a rollover situation.

The above and other known systems consider controlling a motorized seatbelt pretensioner or another safety device to activate upon the detection of a dangerous situation like a collision, a rollover, and emergency braking. The above known systems do not adequately take advantage of available vehicle information, vehicle environmental information, and vehicle systems to provide progressive activation for seamless performance. Also, none of these patents teaches extending the operation range of the pretensioners to help the dynamic comfort of an occupant during a non-safety situation like handling a maneuver.

Because a pretensioner is generally the only means that directly influences an occupant's posture, it may be desirable to extend the pretensioner's operation range beyond dangerous situations like collision and rollover. For example, it may be desirable to use the motorized pretensioner to help reduce uncomfortable occupant body motion during non-safety-related dynamic maneuvers.

It is also desirable to share sensor elements for both passive safety and active safety systems to eliminate unnecessary cost.

SUMMARY

A control scheme is provided in an integrated control system, which interactively connects control modules including a vehicle dynamics control module, a reversible restraint module, an irreversible restraint module, an interior control module, etc. Such an integrated control system optimizes, prioritizes, and coordinates the various functions achieved by these control modules through sharing sensing information among the modules so as to achieve seamless control performances. By classifying the dynamics operation of the vehicle as controllable but stable, controllable unstable, and uncontrollable dynamics, the level of control may be varied.

Another aspect of the invention uses motorized seatbelt pretensioners to help an occupant's dynamic comfort during aggressive non-hazard-related maneuvers, in which active safety systems such as vehicle stability controls are usually activated, while the sensor signals and states calculated in vehicle stability controls are used to help determine when and how to activate the motorized seatbelt pretensioner for safety-related performance during a crash hazard.

The control means of the motorized pretensioners activates the pretensioners in response to unstable but controllable vehicle dynamics, such as mitigation of an un-tripped rollover by roll stability control; activates the pretensioners in response to uncontrollable vehicle dynamics including collision, tripped rollover, et cetera; activates pretensioners proportionally to quantities that are functions of the acceleration and angular rates of occupants (estimated based on vehicle sensors); and resets the activation level to zero when such quantities are small.

Advantageously, with an inertial measurement unit, vehicle dynamics control can be used to detect accelerations at any of the seat locations. Hence, local accelerometers that were intended for seat state estimation can be eliminated. In addition, the occupant protection system operation can utilize the vehicle state information gained from the vehicle dynamics control systems to progressively proceed so as to achieve seamless activation. Such seamless activation provides sufficient lead time to avoid sudden and high-energy activation required at the time of a collision, thus it potentially reduces the size of actuators.

The current integration achieves an additional performance that is not addressed by either current vehicle dynamics control systems or occupant protection systems. That is, the vehicle dynamics control systems control the vehicle body motion and never directly control the occupant motion with respect to the seat. Also, the traditional occupant restraint systems are only activated (restrain the occupants) when there is a safety hazard like a collision, crash, or rollover.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 12 is a flow chart of a method of operating a second embodiment of the present invention.

DETAILED DESCRIPTION OF THE PREFERRED EMBODIMENT

Figure 1:
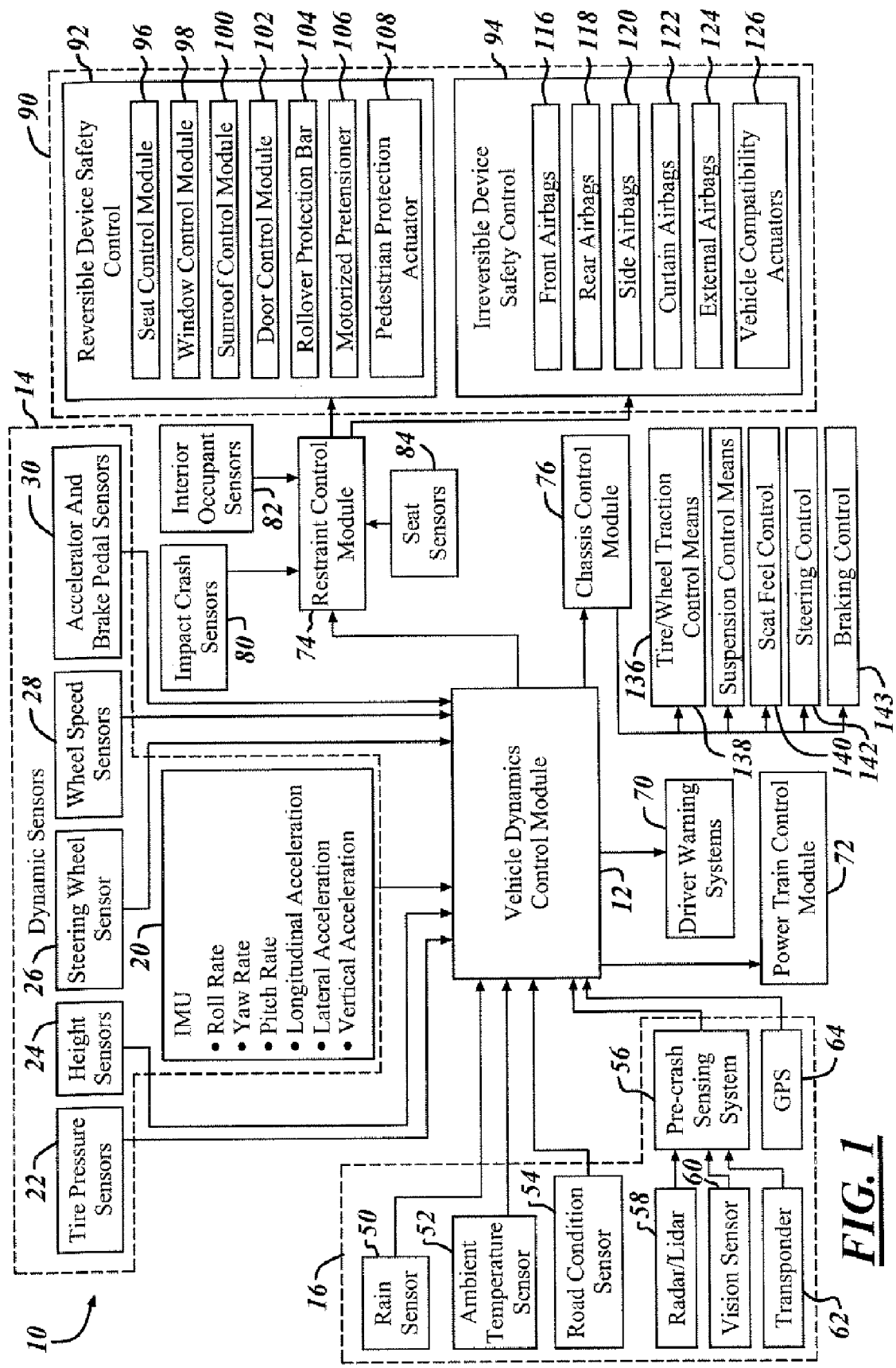
FIG. 1 is a block diagrammatic view of an integrated safety and vehicle dynamics control system according to the present invention.

In the drawing figures discussed as follows, the same reference numerals will be used to refer to same or similar features of the present invention so as to illustrate the invention. The following description is set forth with respect to two general embodiments. The first embodiment is a general embodiment of a combination of a dynamic control system and a safety system. The second embodiment is a specific implementation of the first embodiment with respect to a motorized seatbelt pretensioner. Although various examples are set forth below, these examples are not meant to be limiting except as set forth in the claims that follow.

The vehicle dynamics can be characterized as controllable dynamics or uncontrollable dynamics. Controllable dynamics are the region of handling performance that is augmented by the driver's control or the driver's control with the aid of electronic control systems equipped with a vehicle. More specifically, controllable dynamics are those vehicle operation states which can be actively altered or mitigated or modified by the driver and through the use of the vehicle's available electronic control systems including power-train and driveline controls, braking controls, steering controls and suspension controls. The controllable vehicle dynamics could include both linear range dynamics and some amount of nonlinear dynamics (for example, based on the state of the tire forces). While the linear portion of the vehicle dynamics can be easily controlled by ordinary drivers, the nonlinear portion of the vehicle dynamics usually requires much more skill to bring the vehicle under control. In certain cases, even the most skilled drivers could not control the nonlinear portion of the vehicle dynamics, and proper active control actuations are required.

The controllable vehicle dynamics could be stable or unstable. For example, a spin-out during an over-steer driving condition is an unstable motion, however it can be prevented from happening through activating the yaw stability control system. Therefore, the vehicle's spin-out is a unstable but controllable dynamics condition. For another example, during an on-road un-tripped rollover event, a vehicle operates in its nonlinear portion of the dynamics and it becomes unstable in its roll motion direction. The vehicle needs help from brake control or other active countermeasures to mitigate the roll motion. Therefore, the vehicle in this case operates under an unstable but controllable dynamics condition.

The uncontrollable dynamics characterizes the vehicle operation states in which vehicle motion cannot be actively altered, mitigated or modified by the driver and the available electronically controlled systems. Even when the electronic controls provides the maximum amount of the available control authority, the vehicle still operates in a divergent motion. One such case is a tripped rollover event, where a large lateral force will exceed the control authority of a brake-based roll stability control system. That is, even when the roll stability control activates, the vehicle roll motion is still divergent and the only safety measure left is deploying passive safety devices like airbags to protect the occupants.

Although identifying the unstable dynamics is easy, the determination of uncontrollable dynamics state is very involved. Since the passive safety devices need to be operated under unstable and uncontrollable conditions, or uncontrollable external hazard conditions, the reliable determination of those conditions is important to the success of the functions of passive safety systems, which are usually irreversible. Due to the progressive feature of unstable and uncontrollable dynamics, an earlier indication started at unstable but controllable stage could well prepare the passive safety devices and provide further justification for a reliable passive safety system deployment. For example, with the increase of a driver's driving aggressiveness, the vehicle dynamics progressively cross the dynamic regions of stable and controllable dynamics, unstable but controllable dynamics, and unstable and uncontrollable dynamics. Therefore, certain active countermeasures right before activating passive safety systems could be conducted so as to provide seamless safety performance for the vehicle. The vehicle information gained during the transition from other vehicle dynamic conditions to unstable and uncontrollable dynamic conditions could also provide a robustness check for reliably deploying passive safety systems.

This invention relates to a method and a system for controlling a vehicle passive safety system apparatus, such that, the apparatus operates upon the detection of unstable and uncontrollable vehicle dynamic operation conditions. It also operates in a preparation manner at the earlier stage of safety countermeasures upon the detection of unstable but controllable dynamics. These operations are in addition to the normal operation of the passive safety apparatus of protecting the occupants against uncontrollable external hazard conditions.

Referring now to FIG. 1, a block diagram of an integrated safety and vehicle dynamics control system 10 is illustrated. The system includes a controller such as a vehicle dynamics control module 12. The vehicle dynamics control module 12 is coupled to various dynamic sensors 14 that sense the dynamics of the vehicle and a plurality of environmental sensors 16 that sense external environmental conditions of the vehicle. The dynamics sensors include an inertial measurement unit (IMU) 20, tire pressure sensors 22, vehicle height sensors 24, a steering wheel sensor 26, a plurality of wheel speed sensors 28, and an accelerator and/or brake pedal sensor 30. Of course, other sensors may be included in the dynamics sensors.

Inertial measurement unit 20 may include a yaw rate, roll rate, pitch rate, longitudinal acceleration, lateral acceleration, and vertical acceleration measurement means provided in one package. Of course, those skilled in the art will recognize that a reduced set of sensors which include less than six IMU sensor components may be used. Also, those skilled in the art will recognize that discrete sensors may be individually provided, which are located in different places, rather than packaged into one module like an IMU sensor cluster, so as to sense the vehicle's accelerations and angular rates individually. Also, those skilled in the art will recognize that more than six sensors might be packaged into an IMU cluster for redundancy purpose or for dual resolution purpose.

The tire pressure sensors 22 may be individually mounted to each of the tires. Tire pressure may also be inferred by the rolling radius of each of the tires of the vehicle determined through the vehicle operation states calculated from the dynamics sensors of the vehicle.

Height sensors 24 may include various types of sensors including radar, laser and various types of contact sensors. The height sensors may sense various heights such as the height of the vehicle body from the road surface. The height sensors may also be incorporated into the suspension of the vehicle. The height sensors generate a signal corresponding to the height of the vehicle. Various numbers of height sensors may be employed.

The steering wheel sensor 26 is coupled to the steering wheel to provide a position thereof. The steering wheel sensor 26 may generate an absolute position or a relative position depending upon the type of system implemented. The steering wheel sensor generates a signal corresponding to the angle of movement of the steering wheel. This, for example, may be the amount of movement from the center in either direction.

Wheel speed sensors 28 may be located at each of the wheels. One type of wheel speed sensor is a toothed-wheel type system that generates pulses in response to the rotational rate of the wheel. Such systems are commonly used in anti-lock braking systems. Wheel speed sensing may also be inferred from various locations such as at the transmission output shaft. The wheel speed sensors 28 may be used to determine the vehicle velocity.

An accelerator and brake pedal sensor 30 may also be provided. An accelerator sensor senses the amount of actuation of the accelerator pedal of the vehicle. The acceleration sensor may also generate a signal corresponding to the rate of movement of the accelerator pedal. A brake pedal sensor 30 may provide a signal corresponding to the operation of the brake pedal. The brake pedal sensor may also provide information as to the amount of brake pedal movement or the rate of brake pedal movement. Of course, both brake pedal movement and rate may be provided by the brake pedal sensor.

The environment sensors 16 may include various sensors including a rain sensor 50, an ambient temperature sensor 52, a road condition sensor 54 and a pre-crash sensing system 56 that may include a radar/lidar sensor 58, a vision sensor 60 and/or a transponder 62. The environment sensors may also include a GPS system 64.

The rain sensor 50 may be one of a number of different types of rain sensors that generate the signal in response to the presence of rain. Rain sensor signals are commonly employed in the operation of automatic windshield wiping systems. Such sensors measure the reflectance of light and generate a different signal in response to moisture on the windshield. This information could be used to improve stability control estimation of road conditions. This information can also be used to condition the activation systems which are exposed to the rain. For example, upon the detection of rain, the brake control system will periodically send a small amount of pressure to calipers to wipe out potential water accumulated in between the brake pad and the brake disk.

Ambient temperature sensor 52 may include various types of sensors including a thermocouple, thermistor, or the like. The ambient temperature sensor 52 generates a temperature signal corresponding to the outside air temperature of the vehicle. This temperature information may be compared with the subsystem temperature sensors in an electronic control unit to determine the heat efficiency of the subsystems. If the subsystems are continuously operated in much higher than normal temperature modes, the driver will be warned and certain control functions and sensor signals might need to be compensated.

The pre-crash system 56 may sense various conditions around the vehicle and assess whether a crash is imminent. Various types of pre-crash systems are illustrated in the patent literature. Such systems may use a radar/lidar sensor, vision sensor, transponders or a combination of the three types of sensors. The vision sensor 60 may be one of a number of various types of vision sensors, including single camera or multiple camera systems located in various orientations on different sides of the vehicle. A transponder 62 may communicate various vehicle information to other vehicles and receive various information from other vehicles so that a potential crash determination may be formed. Thus, the pre-crash sensing system generates a signal corresponding to the likelihood of a crash. Such systems may be used to prepare the vehicle such as pre-arming airbags or charging hydraulic systems in case a crash is imminent.

The global positioning system (GPS) 64 generates a position signal of a vehicle. The global positioning system 64 may be a differential system that may be used to sense the velocity and direction of the vehicle. The global positioning system 64 can also provide preview information about a road curvature condition so that the vehicle can be prepared to enter a curve.

Based upon the received sensor signals, the vehicle dynamics control module 12 computes the operation states for the driver, for the vehicle, and for the environment around the vehicle. The necessary feedback control commands for altering, modifying or mitigating the undesirable vehicle motion states are also computed in the vehicle dynamics control module 12 as will be further described below. Various signals calculated in the vehicle dynamics control module 12 are provided to various other control modules in the vehicle.

The vehicle dynamics control module 12 may be coupled to a driver warning system 70, a powertrain control module 72, a restraint control module 74, and a chassis control module 76.

The driver warning system 70 may generate various types of driver warnings including audible warnings, visual warnings and haptic warnings. The warnings may provide various types of feedback corresponding to the conditions sensed by the various sensors.

The powertrain control module 72 is used to control the transmission and engine of the vehicle. For example, upon sensing certain conditions, the powertrain control module may command the transmission to downshift. Also, a modification to engine power may be commanded by the powertrain control module. The powertrain control could also manage the torque transfer between axles and between the wheels on each axle, for vehicles with transfer case and differential control actuation.

The restraint control module 74 may have various sensors coupled thereto. An impact crash sensor 80 generating a signal corresponding to an impact of the vehicle may be coupled to the restraint control module 74. An interior occupant sensor 82 generates a signal corresponding to the position or presence of occupants within the vehicle. Various types of interior occupant sensors may be provided including weight sensors, infrared sensors, vision sensors, or the like. Restraint deployment strategies may be changed based upon the interior occupant sensor signals.

A seat sensor 84 may also be coupled to the restraint control module. The seat sensor 84 may provide a signal corresponding to the position of the seat. Various types of positions may be set forth such as the angular position of the back of the seat, the angular position of the base of the seat, and the relative position of the seat with respect to the vehicle. The restraint control module may be coupled to various types of safety controls 90 including a reversible device safety control 92 and an irreversible device safety control 94.

The reversible device safety control 92 may include a seat control module 96 that is used to control the position of the seats. A window control module 98 may also be included in the reversible device safety control 92. The window control module 98 may be used to adjust the position of the windows preferably to a closed position in a crash or potential crash. A sunroof control module 100 may be used to close the sunroof in response to a potential crash situation. A door control module 102 may be used to lock the doors in response to the vehicle conditions. A rollover protection bar 104 may also be actuated in response to the vehicle conditions. A motorized pretensioner 106 may be used to pretension the seatbelts in response to the vehicle conditions. A pedestrian protection actuator 108 may also be provided. The pedestrian protection actuator 108 may provide exterior protection to a pedestrian. For example, the pedestrian protection actuator 108 may be used to move components of the vehicle to reduce injury to a pedestrian upon a crash.

Irreversible device safety control module 94 may include front airbags 116, rear airbags 118, side airbags 120, curtain airbags 122, external airbags 124, and vehicle compatibility actuators 126. External airbags 124 may also be used for pedestrian protection. Vehicle compatibility actuators 126 may be reversible or irreversible but have been placed in the irreversible category for convenience.

The chassis control module 76 may be coupled to a tire/wheel traction control means for providing traction to the vehicle. The chassis control module 76 may also be coupled to the suspension control means 138 used for controlling the suspension including the height or position of the suspension, a seat feel control device 140 used to provide feel to the driver based upon the sensed conditions. The chassis control module 76 may also be coupled to a steering controller 142 for controlling the steering or the position of the steered wheels. Such a control system 142 would be advantageous in a steer-by-wire type system. The steering control system 142 may be used to control the front wheels or wheels through an associated actuator. Also, various actuators may be provided to individually control the position of the wheels. A toe-in or out adjustment may also be provided during various maneuvers. This may be considered a steering control or a suspension control function. The chassis control module 76 may also be coupled to a brake controller 143 for controlling the brakes to achieve various brake-based control functions such as anti-lock, traction control, roll stability control and yaw stability control.

Figure 2:
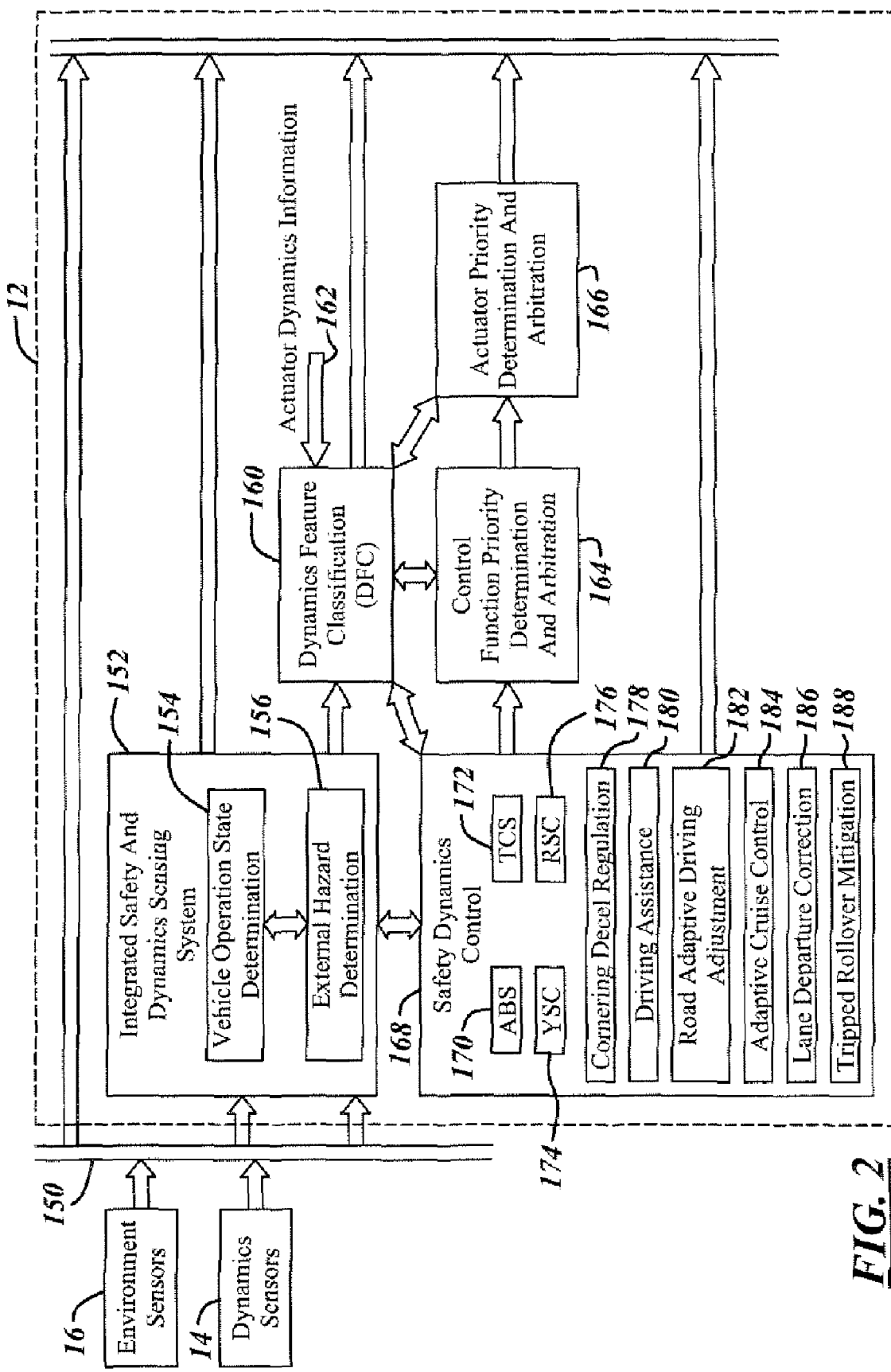
FIG. 2 is a block diagrammatic view of the vehicle dynamics control module of FIG. 1.

Referring now to FIG. 2, the vehicle dynamics control module 12 is illustrated in further detail. The vehicle dynamics control module may be coupled to dynamics sensors 14 and environment sensors 16 through a vehicle bus 150. The vehicle dynamics control module 12 includes a number of sensing algorithms and a collection of feedback control algorithms performing multiple control functions based on the sensing algorithms. The sensing algorithms receive the available sensor signals to characterize the interaction among the driver, the vehicle and the vehicle's external environment including the road and other moving and non-moving objects.

The vehicle dynamics control module 12 includes an integrated safety and dynamics sensing system 152. The integrated safety and dynamics sensing (ISDS) system 152 has various sensing algorithms therein. The integrated safety and dynamics sensing system 152 identifies the vehicle's operational states and the driver's intention during travel using a vehicle operation state determination 154. An external hazard determination is provided by external hazard determination 156. The vehicle operation state determination 154 and external hazard determination 156 are coupled together. Based upon the information processed and calculated from the integrated safety and dynamics sensing system 152, the vehicle dynamics features such as controllability and stability of the vehicle may be readily determined. The determination of the controllability and stability is performed in the dynamics feature classification module 160. The dynamics feature determination will also involve information from those control functions that are expected for conducting control and information regarding actuator specific dynamics as illustrated by arrow 162. The information processed in the dynamics feature classification 160 is fed into the control function priority determination and arbitration module 164 and the actuation priority determination and arbitration module 166.

A collection of control functions called the safety dynamics control module 168 is illustrated in FIG. 2 as coupled to the integrated safety and dynamics sensing system 152, the dynamics feature classification (DFC) 160, and the control function priority determination and arbitration block(s) 164. The safety dynamics control module 168 receives signals from the various sensors, the integrated safety and dynamics sensing system 152, and the dynamics feature classification 160. Based upon those signals, the necessary feedback control commands in the vehicle level or actuator level may be provided. Vehicle level control may, for example, comprise controlling the roll moment in a roll stability control system 176. Actuator level control may comprise controlling the anti-lock brake system 170. The safety dynamics control module 168 is a broad category for the anti-lock brake system (ABS) 170, the traction control system (TCS) 172, the yaw stability control (YSC) system 174, the roll stability control (RSC) system 176, a cornering deceleration regulation unit 178, a driving assistance unit 180, a road adaptive driving adjustment unit 182, an adaptive cruise control unit 184, a lane departure correction unit 186, and a tripped rollover mitigation unit 188. Of course, various other functions may be evident to those skilled in the art.

The vehicle level control from the safety dynamics controller 168 may, for example, be the total yaw moment for counteracting the vehicle's yaw motion. If multiple actuators are involved in a control function, the vehicle level control command may be decomposed into actuator level commands such that the vehicle level control can best be achieved, when the involved actuators activate according to the demanded actuator level commands. The vehicle level control command may come from different function requests. A function decomposition may be used and includes control functions of significance for the vehicle dynamics and controls. The various systems within the safety control function determine an amount of feedback control in vehicle level. In some cases, actuator level control may be needed.

The dynamics feature classification (DFC) unit 160 may determine that the vehicle operates under controllable dynamics. If so, safety dynamics control block 168 may request one or more feedback control commands such as roll moment feedback (vehicle level command for rollover protection), pitch moment feedback (vehicle level command for pitch over prevention), yaw moment feedback (vehicle level command for spin-out prevention), lateral acceleration regulation (vehicle level command), longitudinal acceleration regulation (vehicle level command), side slip angle regulation (vehicle level command for vehicle lateral sliding prevention), and longitudinal slip regulation (actuator level command). During unstable vehicle dynamics, the safety dynamics control unit 168 is likely to compute several control commands. For example, an aggressive steering induced rollover event may start from a large yaw motion of the vehicle and then develop into a larger roll motion and a potentially larger lateral sliding. Coordination, prioritization and arbitration of those different control demands may be required in block 164. On the other hand, when the vehicle is equipped with multiple electronic control systems such as multiple actuators, each of them may achieve a specific function. There is also a need to prioritize or arbitrate among those actuators to achieve the desired vehicle level control command in block 166. For example, controlled brakes, controlled anti-roll-bar, controlled front wheel steering, and controlled rear wheel steering may all be used to perform certain roll stability control functions. Actuator priority determination and arbitration unit 166 is dedicated to determine the proper actuators to most effectively realize the vehicle control command received from the control function priority determination and arbitration unit 164. The vehicle dynamics control module commands the individual control modules to achieve the command. In this way the vehicle dynamics control module 12 acts as a local controller. For example, the RSC function in the vehicle dynamics control module 12 generates a counteracted roll moment and a control command in terms of caliper pressure at certain brake locations. When the specified brake system control has to achieve the pressure command based upon its hydraulics, local actuator information like measured or estimated caliper pressure and brake dynamics are modified using a command following a control strategy. Based upon the input from the integrated safety and dynamics sensing system 152, the safety dynamics control unit 168, the function priority determination and arbitration unit 164, and the actuator priority determination and arbitration 166, the dynamics information of the actuators which are specified by the various units, the vehicle dynamics control module determines whether the vehicle is operating under stable or unstable dynamics, controllable or uncontrollable dynamics conditions. It also establishes appropriate control threshold values for various combinations of the stability and controllability using stable, unstable but controllable, unstable and uncontrollable dynamics conditions. The dynamics feature classification unit 160 determines the controllability and unstableness of the vehicle.

Figure 3:
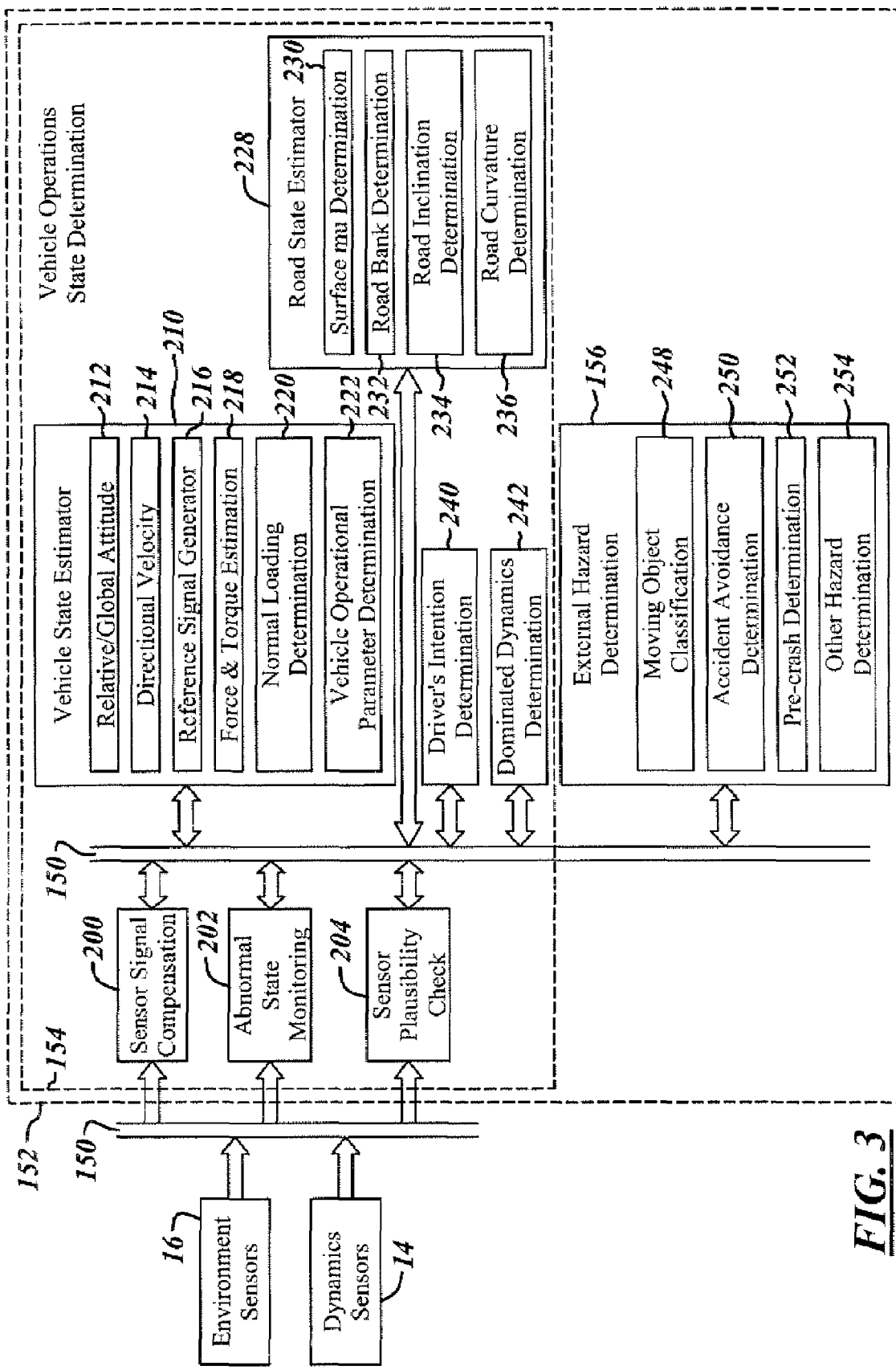
FIG. 3 is a block diagrammatic view of the vehicle operation state determination of FIG. 2.

Referring now to FIG. 3, the integrated safety and dynamics sensing system 152 of FIG. 2 is illustrated in further details.

The vehicle operation state determination 154 is illustrated in further detail. The vehicle operation state determination 154 may include sensor signal compensation 200, abnormal state monitoring 202, and a sensor plausibility check 204. The sensor signal compensation, abnormal state monitoring and sensor plausibility check are used to correct and adjust the various sensor signals. The output of the sensor signal compensation 200, abnormal state monitoring 202, and sensor plausibility check 204 may be coupled to a vehicle state estimator 210. The vehicle state estimate includes a vehicle global and relative attitude determination 212. The relative/global attitude determination 212 may be characterized by the vehicle body Euler angles with respect to sea level or with respect to the average road surface. A directional vehicle velocity block 214 is used to determine the absolute vehicle velocity projected along the vehicle body fixed longitudinal and latitudinal direction. A vehicle reference signal generator 216 may also be included in the vehicle state estimator 210.

The vehicle state estimator 210 may also include a force and torque estimation block 218 that estimates the forces and torques acting on the vehicle. A normal loading determination 220 determines the normal loading acting at each of the wheels of the vehicle. A vehicle operational parameter determination 222 may also be provided within the vehicle state estimator 210. The vehicle operational parameter determination 222 may include vehicle loading, tire rolling radii, vehicle mass, and various other parameters.

A road state estimator 228 may also be coupled within the vehicle operation state determination 154. The road state estimator 228 is illustrated coupled to bus 150. The road state estimator 228 may include a surface friction determination 230 that generates a signal corresponding to the road surface friction level. Surface friction is sometimes referred to as surface mu ($\mu$). A road bank determination unit 232 may also be provided within the road state estimator 228. The road bank determination unit 232 determines the bank angle of the road. The bank angle of the road is the lateral or sideways angle of the road in a direction perpendicular to the normal or intended travel direction of the road.

A road incline determination 234 is also provided within the road state estimator 228. The inclination determination 234 determines the angular inclination of the road in the direction of normal vehicle travel on the road.

A road curvature determination 236 may also be provided within the road estimator block 228. The road curvature determination determines the radius of curvature of the road on which the vehicle is traveling.

The vehicle operational state determination 154 may include a driver's intention determination block 240. The driver's intention determination block 240 may provide an indication as to the desired vehicle motion path or the desired vehicle moving rate (such as the desired yaw rate of the vehicle) from the driver. A dominated dynamics determination block 242 may also be coupled to the bus 150 and receive various information therefrom. The dominated dynamics determination unit is used to classify the main control direction of the vehicle dynamics if there are multiple functions requested at the same time. For example, if a roll dominated motion is set forth, roll stability control is likely to provide a majority control in order to control the roll motion of the vehicle. Although the single dominated vehicle dynamics is possible, many times the vehicle operates under combined dynamics. For example, a large vehicle yawing on a high friction road surface may cause a large roll motion. In this case, it may be possible for both yaw stability control and roll stability functions to request control at the same time. Therefore, it is important to assess which should be classified as the dominated control direction.

External hazard determination 156 of the integrated safety and dynamics sensing system 152 is illustrated. The external hazard determination block includes a moving object classification 248, an accident avoidance determination 250, a pre-crash determination 252, and another hazard determination 254. Based upon the various inputs from the cameras and the like, a moving object may be classified into one of a number of predetermined categories, including a vehicle or size of vehicle and the direction of the vehicle. An accident avoidance determination may be made based upon the dynamic conditions in the heading of both the host vehicle and a target vehicle. A pre-crash determination determines whether or not a collision is predictable.

Figure 4:
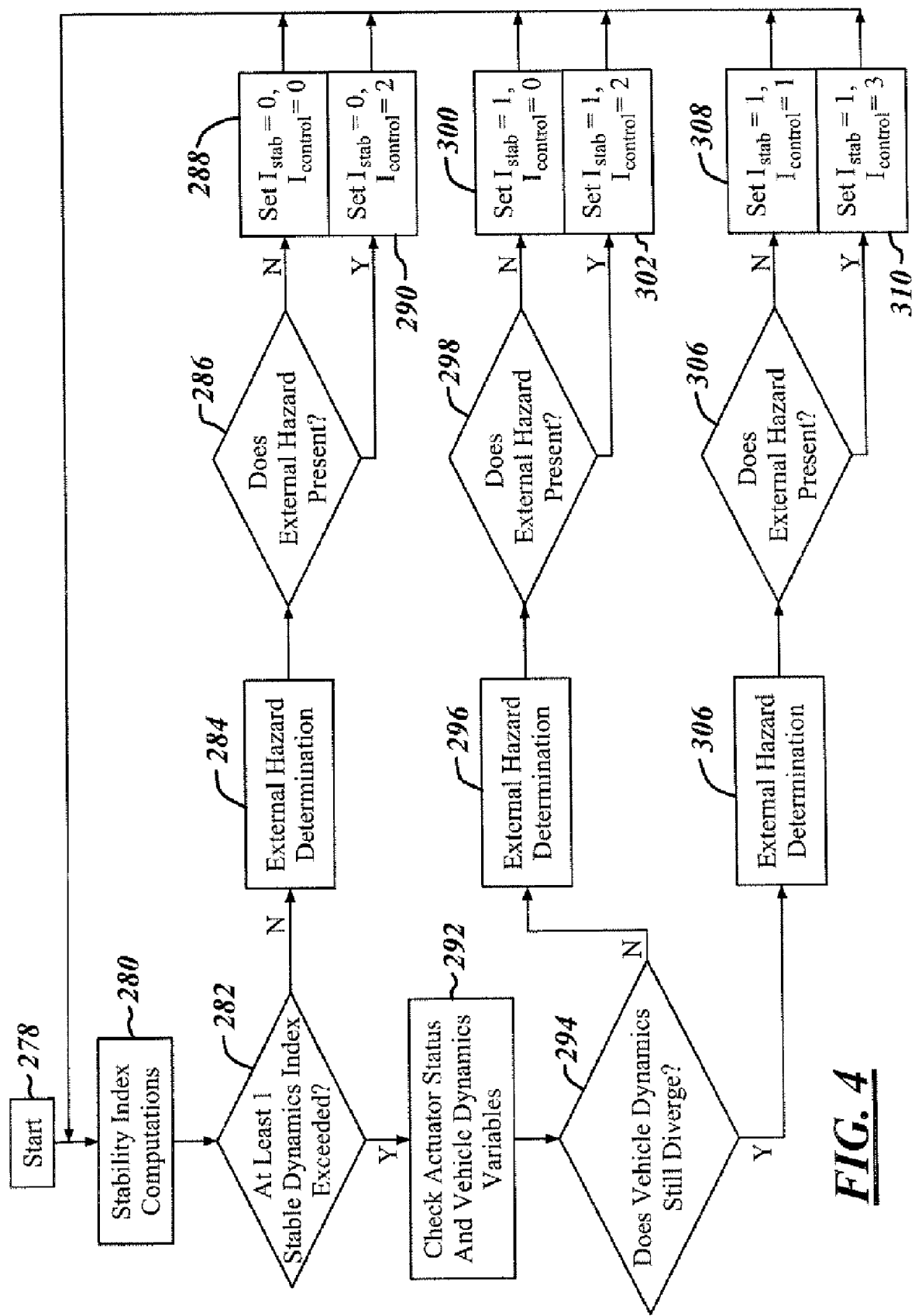
FIG. 4 is a flow chart of a method for determining a dynamic feature classification.

Referring now to FIG. 4, a flow chart illustrating the operation of the dynamics feature classification 160 of FIG. 2 is illustrated. The flow chart starts in step 278. In step 280, a stability index computation is determined. The stability index computation will be illustrated below with respect to FIG. 5. Deviations of various variables are related to the vehicle dynamics from the desired or referenced variables determined above. Some of the desired or referenced variables have zero value and some are dependent upon driving conditions. For example, in the yaw stability control system, the yaw rate error is calculated based on the measured yaw rate and the target yaw rate calculated from the driver's steering input to a bicycle vehicle model. The ideal or desired side slip angle of the vehicle at the rear axle is close to zero, hence the rear side slip angle error is equal to the computed rear side slip angle. The stability indexes here imply the values which are obtained by calculating the magnitudes of deviations or error signals. Certain threshold values for the stability indices are also computed based upon the driving conditions. In step 282 it is determined whether at least one stable dynamics index is exceeded. If none have been exceeded, an external hazard determination is performed in step 284. In step 286, if the external hazard is not present, step 288 is executed in which the variable $I_{stab}$ is set to zero and the variable $I_{control}$ is also set to zero. The variable $I_{stab}$ denotes the unstable dynamics flag and the $I_{control}$ denotes the uncontrollable vehicle dynamics flag. When $I_{stab}$ equals zero, the vehicle is stable. When the vehicle is controllable, $I_{control}$ equals zero.

Referring back to step 286, if an external hazard is present, step 290 is executed in which $I_{stab}$ is set to zero and $I_{control}$ is set to 2. If the vehicle dynamics indicate the vehicle is controllable but the external hazard causes an uncontrollable hazard to the host vehicle, $I_{control}$ is set to 2.

Referring back to step 282, if at least one stable dynamics index is exceeded, the actuator status and vehicle dynamics variables are determined in step 292. In step 294, it is determined whether or not the vehicle dynamics still diverge. If the dynamics do not diverge, another check for an external hazard is performed in step 296. If an external hazard is not present in step 298, $I_{stab}$ is set to 1 and $I_{control}$ is set to zero in step 300. That is, the vehicle is in a controllable condition as indicated by $I_{control}=0$. Thus, in box 300 the vehicle is controllable but an unstable condition.

Referring back to step 298, if an external hazard is present, step 302 is executed in which the stability $I_{stab}$ is set to 1 and $I_{control}$ is set to 2. $I_{stab}$ is set to 1 when an unstable but controllable dynamic condition exists. Thus, in box 302 the unstable but controllable dynamics condition is present and an uncontrollable external hazard is also present.

Referring back to step 294, if the vehicle dynamics still diverge, step 306 is performed. Step 306 determines whether an external hazard is present. If an external hazard is not present, $I_{stab}$ is set to 1 and $I_{control}$ is set to 1. That is, the vehicle is in an unstable dynamic condition and the vehicle is in an uncontrollable condition due to vehicle dynamics. One example of such a condition may be a sliding vehicle entering a tripped rollover. This last step is performed in step 308. Referring back to step 306, if an external hazard is present, $I_{stab}$ is set to 1 and $I_{control}$ is set to 3 in step 310. When the vehicle dynamics are in an uncontrollable mode at the same time there are external hazards present, $I_{control}$ is set to 3.

It should be noted that there are three types of situations that may render the uncontrollable status of the vehicle: the uncontrollability solely due to uncontrollable vehicle dynamics, uncontrollability solely due to external hazards, uncontrollability due to both dynamics uncontrollability and the presence of the external hazards. Thus, the above-mentioned flow chart distinguishes these three uncontrollability conditions.

Figure 5:
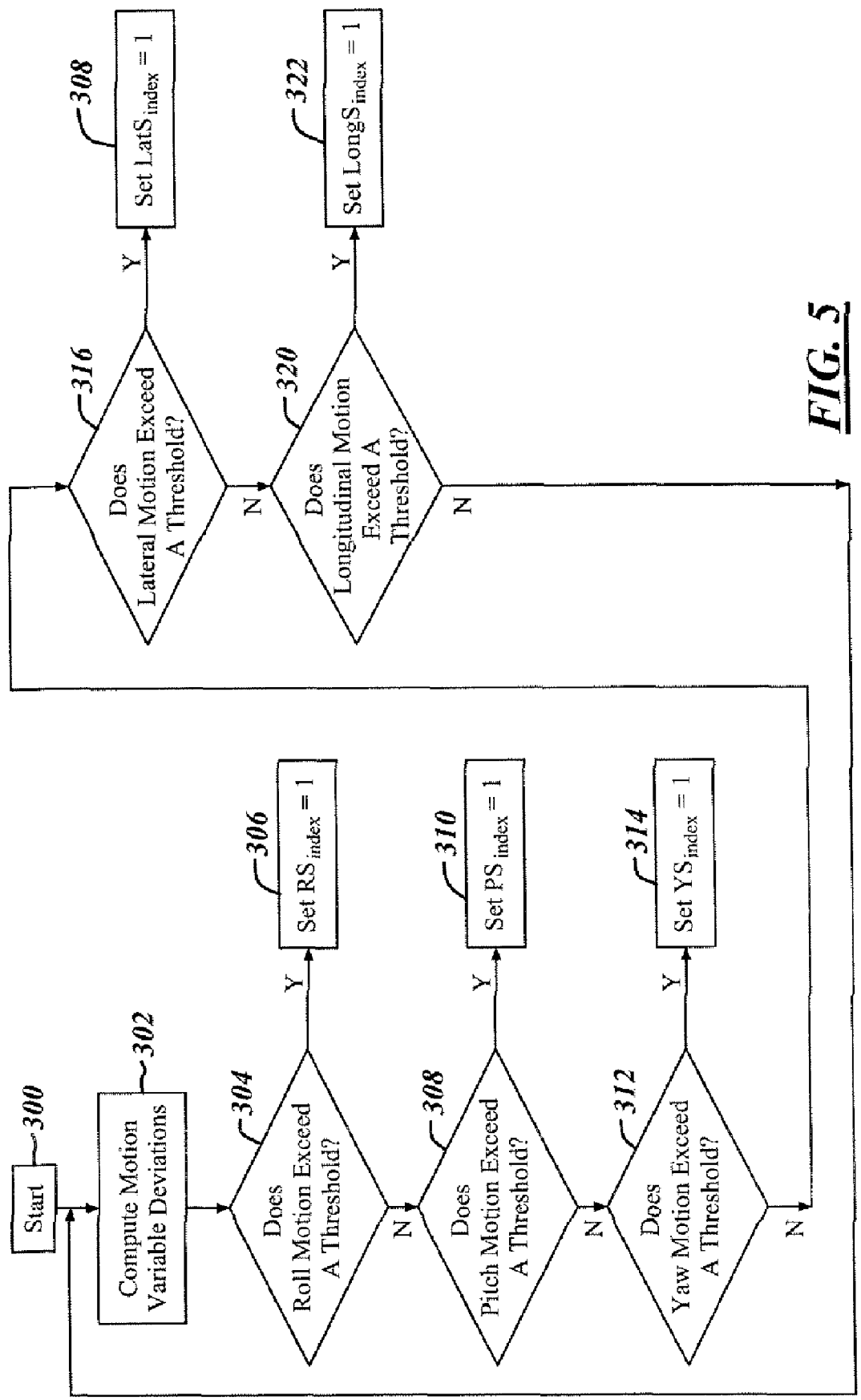
FIG. 5 is a flow chart of a method for determining a stability index.

Referring now to FIG. 5, a determination of the stability indices of step 280 of FIG. 4 is illustrated. The process starts in step 300. The motion variable deviations are computed in step 302. In step 304, if the roll motion exceeds a threshold in step 304 the roll stability index $RS_{index}$ is set to 1 in step 306. Referring back to step 304, if the roll motion does not exceed a threshold in step 304, step 308 is executed in which it is determined whether or not the pitch motion exceeds a threshold. If the pitch motion does exceed a threshold the pitch stability index is set to 1 in step 310. Referring back to step 308, if the pitch motion does not exceed a threshold, then step 312 is executed in which the yaw motion is compared to a threshold. If the yaw motion and/or a side slip angle exceeds a certain threshold, step 314 is executed in which the yaw stability index $YS_{index}$ is set to 1. Referring back to step 312, if the yaw motion does not exceed a threshold the lateral motion is compared to a threshold in step 316. In step 316, if the lateral motion exceeds the lateral motion threshold step 318 is executed in which the lateral stability index $LatS_{index}$ is set to 1. In step 316, if the lateral motion does not exceed a threshold, step 320 is executed. In step 320, if the longitudinal motion exceeds a threshold, step 322 is executed in which the longitudinal stability index is set to 1. If the longitudinal motion does not exceed a threshold in step 320 the process restarts at step 302. When any of the stability indices are set to 1, the vehicle is in an unstable mode. If none of the five stability indices are set to 1 the vehicle is in a stable mode.

Figure 6:
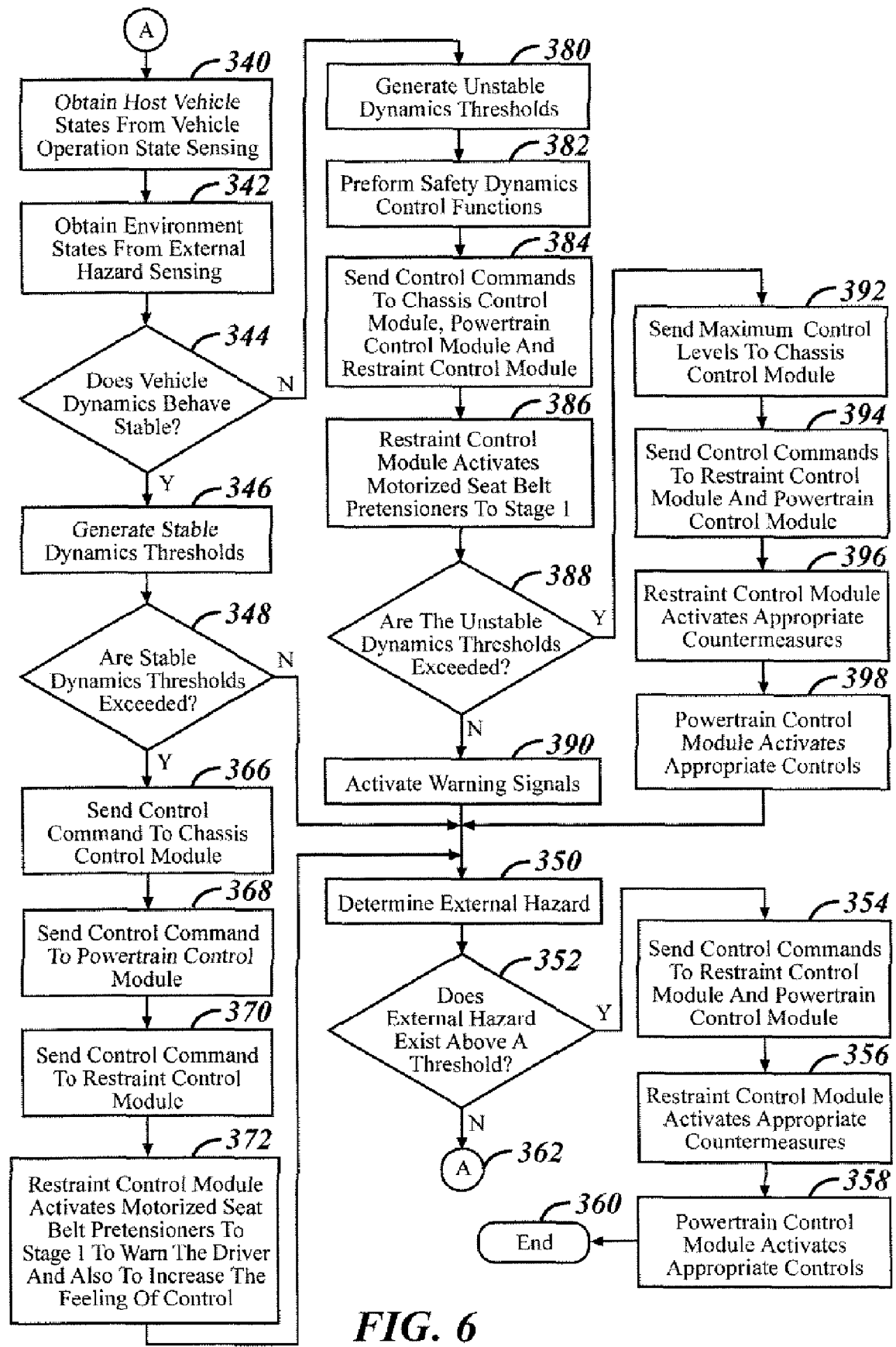
FIG. 6 is a first embodiment of a method of operating an integrated safety and vehicle dynamics control strategy according to the present invention.

Referring now to FIG. 6, an integrated safety and vehicle dynamics control strategy is set forth. In step 340 the host vehicle states are determined from the vehicle operation state sensor. In step 342 the environment states from the external hazard sensing is determined. In step 344, it is determined whether or not the vehicle dynamics are stable. If the vehicle dynamics are stable, step 346 is executed in which the stable dynamics thresholds are determined. In step 348, if the stable dynamic thresholds are not exceeded, step 350 is executed. In step 350 the presence of an external hazard is determined. If an external hazard exists above a threshold in step 352, step 354 is performed. In step 354, control commands are sent to the restraint control module and the powertrain control module. In step 356 the restraint control module activates appropriate countermeasures. In step 358 the powertrain control module activates appropriate control measures. In step 360 the process ends. Referring back to step 352, if an external hazard does not exist above a threshold, step 362 is performed which returns the system back to step 340. Referring back to step 348, if the stable dynamics exceeds a threshold, step 366 is performed. In step 366, a control command is sent to the chassis control module. In step 368 a control command is sent to the powertrain control module. In step 370 a control command is sent to the restraint control module and in step 372 the restraint control module activates the motorized seatbelt pretensioners to stage 1 which warns the driver and also increases the feel of control. The system then continues to step 350.

Referring back to step 344, if the vehicle dynamics do not behave stably, step 380 is performed. In step 380 the unstable dynamics thresholds are determined. In step 382 the safety dynamic control functions are performed. In step 384, the control commands are sent to the chassis control module, the powertrain control module and the restraint control module. In step 386 the restraint control module activates the motorized seatbelt pretensioners to stage 1. In step 388, if the unstable dynamics thresholds are not exceeded, step 390 is performed in which warning signals are activated. Referring back to step 388, if unstable dynamics thresholds are exceeded, a maximum control level is sent to the chassis control module in step 392. In step 394, control commands are also sent to the restraint control module and the powertrain control module. In step 396, the restraints control module activates appropriate countermeasures. In step 398 the powertrain control module activates appropriate controls. As is illustrated above, steps 392-398 represent an uncontrollable, unstable mode. Steps 380-386 represent controllable but unstable mode and steps 366-372 represent a controllable stable mode. It should be noted that the level of control of each of these sets of steps is different based upon the classification.

It should be noted that the vehicle dynamics under appropriate situations are determined. The various vehicle control levels are determined in unstable but controllable, unstable and uncontrollable, and controllable stable condition. These conditions each have varying levels of control that are provided to the various modules such as a chassis control module, powertrain control module, and restraint control module. The divergence of the vehicle dynamics are assessed during this determination.

If the vehicle dynamics is not in divergent mode, the dynamics is probably in controllable modes. Detecting dynamics divergence and convergence may be involved for any specific motion directions and various ways are used to determine the divergent dynamics that are both vehicle platform and driving condition dependent. The unstable but controllable dynamics means that the vehicle dynamics is divergent without controls but is convergent if controls are activated, which might be characterized as some or some of the combinations of the following:

large magnitude of roll angular rate but below the first threshold;
large magnitude of vehicle body to road roll angle but below the first threshold;
large magnitude of yaw angular rate but below the first threshold;
large magnitude of vehicle side slip angle but below the first threshold;
large magnitude of lateral acceleration but below the first threshold;
sudden driver braking request together with large magnitudes of other motion variables below the first threshold;
large magnitude steering wheel angle but below a first threshold;
large magnitude steering wheel angle velocity but below the first threshold;
the magnitude of the wheel departure angle below the first threshold.

The unstable and uncontrollable dynamics is usually due to large deviations of the tire forces from the nominal driving conditions. A vehicle disturbance that limits the tires capability to apply force, will limit the control authority of a chassis (stability) control system. For example, a large camber angle of the tire or low friction road surface. It means that the vehicle dynamics is divergent without actuating controls but is still divergent even if significant amount of control actuations are performed, which may be characterized as some or some of the combinations of the following:

during last X milliseconds, did the vehicle operate under unstable but controllable dynamics?
during last Y milliseconds, did the vehicle safety dynamics control system like yaw stability and roll stability controls request control command and some actuators had been activated, and significant amount of control actuations has been achieved (based on the actuator dynamics and the local sensor information associated with each specific actuator)?
large magnitude of roll angular rate exceeding the second threshold;
large magnitude of vehicle body to road roll angle exceeding the second threshold;
large magnitude of yaw angular rate exceeding the second threshold;
large magnitude of vehicle side slip angle exceeding the second threshold;
large magnitude of lateral acceleration exceeding the second threshold;
sudden driver braking request together with large magnitudes of other motion variables exceeding the second threshold;
large magnitude steering wheel angle exceed the second threshold;
large magnitude steering wheel angle velocity exceeding the second threshold;
the magnitude of the wheel departure angle exceeding the second threshold.

When the vehicle is operating under unstable but controllable conditions (detection performed in the dynamics feature classification unit 160 and explained in FIG. 4), upon receiving appropriate signals from the vehicle dynamics control module (VDCM) 12, indicating that the pre-determined quantities have exceeded the first set of some dynamic threshold values, the powertrain control module (PCM) may perform operations, such as, fuel cut-off to the engine, down shifting of the transmission, etc, to selectively modify the total vehicle speed. Upon receiving proper signals from the VDCM 12, the chassis control module (CCM) may operate tire/wheel traction control means, suspension height adjustment means and seat feel control means, active steering control, anti-roll-bar control, and active suspension control to achieve safety dynamics control functions such as roll stability control, yaw stability control, ABS, TCS, cornering deceleration regulation, driving assistance, road adaptive adjustment, adaptive cruise control, lane departure correction and tripped rollover mitigation. For example, individual tire/wheel traction may be modified by selective application brakes, spraying materials/fluids on the tires or on the road in front of the tires, etc. to achieve some of the safety dynamics control functions. The suspension height can be varied, by changing the air pressure in the air suspension systems. The above steps can be taken in a controlled manner to enhance vehicle dynamic control (for example, roll stability control), when the vehicle is operating in the unstable but controllable dynamic range. In the case of seating systems equipped with seat pressurizing systems, the CCM may also selectively pressurize portions of seat side supports and seat back supports to provide the driver with proper lateral seat support to enhanced his vehicle control feel. This is set forth in step 380-386.

While operating within unstable but controllable range, upon receiving the appropriate messages indicating that the pre-determined threshold values have been exceeded, proper commands decomposed from the vehicle level command are sent to individual actuators in chassis control module 76, the powertrain control module 72 and the restraint control module 74. The chassis control module 76 and powertrain control module 72 will realize the required vehicle level control functions. The restraint control module (RCM) 74 may activate the motorized seatbelt pretensioners to a stage 1 (lower tension stage) to warn the driver of the vehicle's state and also to increase his adhesion to the seat system.

An approach similar to the one described above, may be followed even in the case of stable dynamic situations when certain stable dynamic threshold values are exceeded, in step 348.

More specifically, when the vehicle is operating in unstable dynamics, the unstable but controllable dynamics thresholds will be generated and the safety dynamics control functions will be conducted and the vehicle motion variables will be monitored. If the magnitude of the motion variables are below the specified thresholds, the vehicle is in unstable but controllable modes. That means the vehicle is under control through electronic controls. Hence, a warning signal is sent to the driver and VDCM also sends control signals to the PCM to modify the host vehicle speed.

When the vehicle is operating in unstable dynamics, and after activating proper actuators, the vehicle is still in divergent mode, this means that the vehicle is in unstable and uncontrollable dynamics modes in steps 392-398. In this case, the safety dynamics controls will send maximum allowed control commands to the appropriate actuators in chassis control module and/or powertrain control module. At the same time, control command is sent to the restraint control module. The PCM shuts off the fuel to the powertrain. Based on the signals received from the VDCM, impact crash sensors, interior and occupant sensors, the RCM activates various countermeasures, such as, motorized seatbelt pretensioners, interior airbags, curtain airbags, seat controls, rollover protection bar controls and external airbags, as needed.

Pretensioner Embodiment

The above briefly mentions the use of a seatbelt pretensioner. The pretensioner can be used with respect to the vehicle dynamics states mentioned above to position the occupant. As mentioned above, vehicle dynamics can be characterized as controllable or uncontrollable, and stable or unstable dynamic conditions. The controllable dynamic condition is the region of handling performance that is augmented by the driver's control with or without the aid of electronic control systems equipped with a vehicle. During stable dynamics, the vehicle motion variables are bounded within normal ranges of the vehicle's steering, braking and throttle inputs.

Since the active controls from vehicle stability controls are event-triggered, their actuations are required instantly upon the detection of unstable dynamics. Therefore, it is possible for the vehicle to experience sudden dynamic excitations with the vehicle body receiving sudden and large motions along the excitation direction. Hence the occupants may experience uncomfortable motion. This, in turn, may lead to uncomfortable occupant movement.

In addition to the large vehicle motions, the inertial forces due to the transitional and rotational accelerations of the vehicle will induce additional occupant body motions. The roll and pitch angles between the bodies of the occupants and the seat backs are examples of this motion. Such motion may be experienced during a dynamic event such as a roll stability control or a yaw stability control event.

Figure 7:
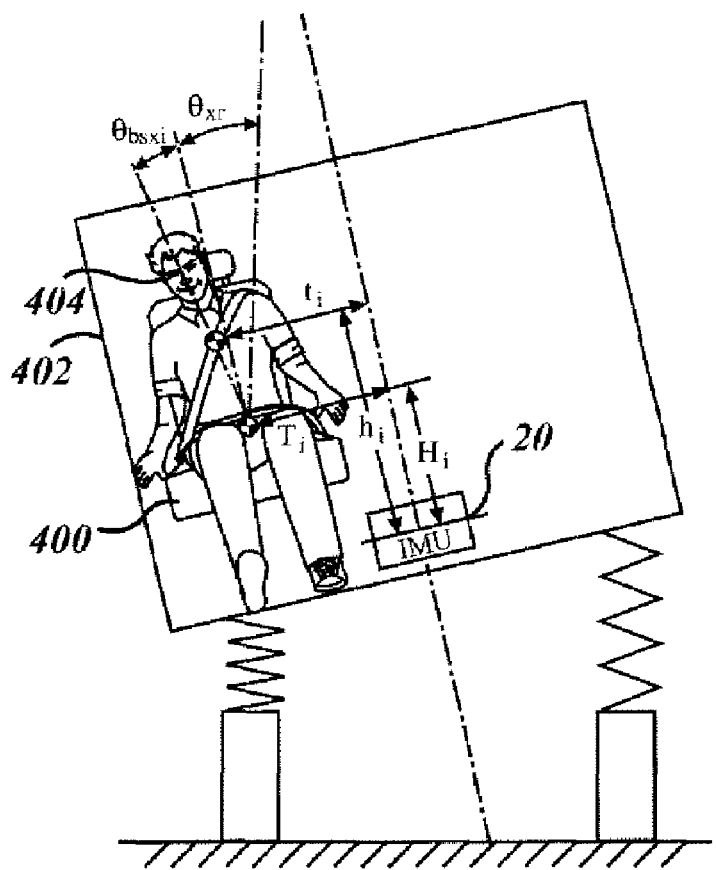
FIG. 7 is a cross-sectional view of an automotive vehicle having an occupant illustrating a separation roll angle according to a second aspect of the invention.
Figure 8:
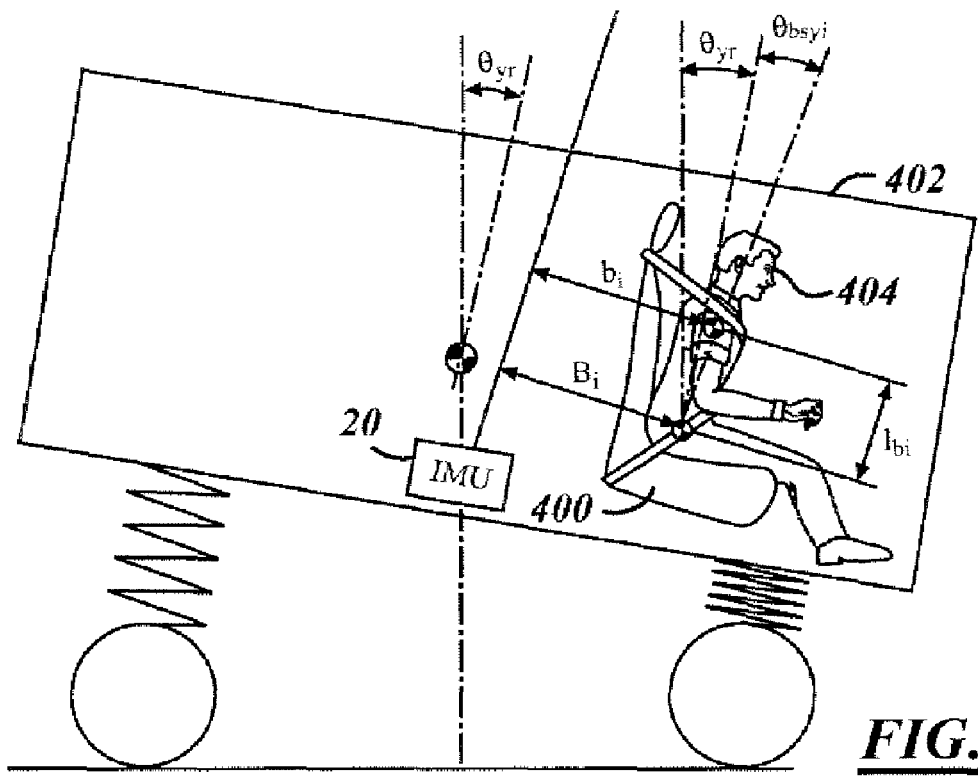
FIG. 8 is a longitudinal cross-sectional view of a motor vehicle illustrating separation pitch angle of an occupant.

Referring now to FIGS. 7 and 8, during a dynamic event the driver initially experiences a peak roll motion or angle $\theta_{bsxi}$ and $\theta_{xr}$ towards the outside of a turn. This is the roll motion of the seat $\theta_{xr}$ plus the motion of the occupant in the seat 400 in the vehicle 402. At the end of the event detection latency, the vehicle braking is activated and a peak pitch motion in the occupants' bodies is achieved. The peak pitch motion is illustrated by $\theta_{bsyi}$ plus the pitch motion of the vehicle $\theta_{yr}$. The angle $\theta_{xr}$ is the relative roll angle and the $\theta_{yr}$ is the relative pitch angle of the vehicle body. Relative here means relative to the road.

During such vehicle dynamics control or stability control events, motorized seatbelt pretensioners may be used to mitigate the relative peak motions of the occupants with respect to the seat or the vehicle. Notice that the vehicle body motions are inevitable although they could be reduced to certain extent through chassis control systems like active suspensions. There are no means in chassis control systems to directly mitigate the relative motion between the body of the occupant 404 and the seat 400.

Motorized seatbelt pretensioner fills such a gap in terms of constraining the occupant's relative motion with respect to the seat during vehicle dynamics and control events, or the stability control events. That is, it can be used to reduce or eliminate the relative pitch and roll angle between the occupant's upper body and the seatbacks. These relative roll and pitch angles are called body-seat separation roll angle $\theta_{bsxi}$ and pitch angle $\theta_{bsyi}$ in this disclosure.

Activating motorized seatbelt pretensioners to mitigate the occupant's body-seat separation angles during an active safety event (vehicle dynamics control or stability control event) is called an occupant dynamic comfort control (ODCC) in this disclosure.

In addition, if an unstable vehicle dynamic event is uncontrollable, or the vehicle is in normal driving condition with an external hazard present (collision hazard), the motorized seat belt pretensioners and other controls will be activated for the purpose of protecting the occupants. In this case, seatbelt pretensioner control module, seat position control module, the seat backrest control module, the vehicle door and sunroof control modules and the air bags are all coordinated and activated based on the hazard level or the level of the divergent vehicle motion. Such a collection of the multiple control modules are called the occupant safety control (OSC). Some of the measures were discussed above in the first embodiment.

When the vehicle motions return to a controllable condition or a stable dynamics condition, the activations from the reversible devices, such as seatbelt pretensioner control module, seat position control module, the seat backrest control module, the vehicle door and sunroof control modules, will be released.

Based on the above discussion, an optimized seamless control activation for the collection of the afore-mentioned control modules, based on the vehicle dynamics state, the environmental states, the occupant states, and the seat states is presented.

As the vehicle dynamics and environmental states are already addressed above, the following discussion focuses on the occupant state determination and the seat state determination, and how to activate necessary actuators to achieve seamless control performance for different function requirements.

Occupant's State Determination

The occupant states are variables which can be used to characterize the occupant relative motion induced by the vehicle motion from the driver's maneuvers. The occupant states include both the dynamic states and the static states.

The occupant dynamic states can be used to characterize the dynamics experienced by the occupant including the relative motion of the occupant's body parts with respect to the seat or the vehicle body. The angular motion and accelerations experienced by the occupants and the body-seat separation angles are some of the dynamic states of the occupant.

The static states are the information which are independent of the vehicle's dynamics, including the weight of the occupant and the position of the occupant with respect to the seat.

Although various sensors can be used for measuring the occupant's states, it would not be feasible for production vehicles due to the high cost associated with such sensors. It is desirable to utilize sensors existed in the vehicle system controls to determine some of the occupant states.

Figure 9:
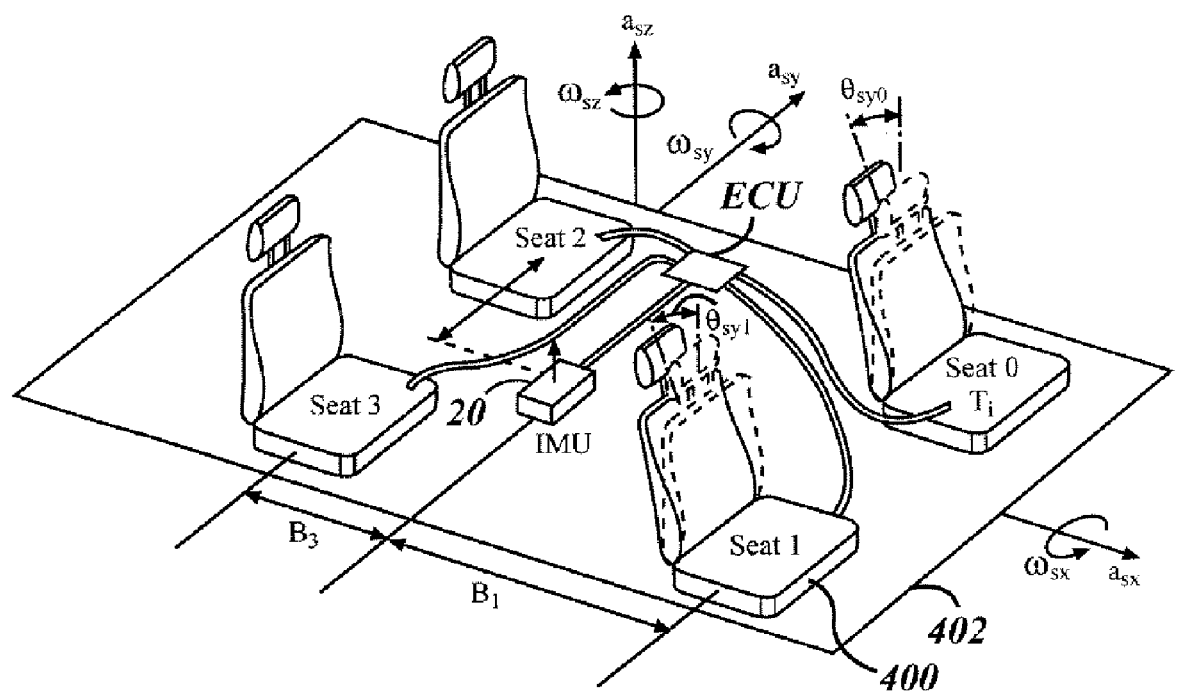
FIG. 9 is a perspective view of a seat state determination system according to a second embodiment of the present invention.

Referring now to FIG. 9, an IMU (Inertial Measurement Unit) 20 (also illustrated in FIG. 1) mounted on the vehicle body 402 has been used for multiple purposes including vehicle dynamics control, vehicle state estimation, rollover detection and other vehicle safety related functions. Such a sensor cluster can characterize the motion or dynamics behavior at any point as soon as such a point is rigidly connected to the vehicle body.

An IMU sensor cluster is mounted along the vehicle body fixed axes. The longitudinal acceleration measuring the car body's acceleration in longitudinal direction (x-axis) is denoted as $a_{sx}$, the lateral acceleration measuring of the car body's acceleration along the lateral direction (y-axis) is denoted as $a_{sy}$. The outputs for the roll, pitch and yaw angular rate sensors are denoted as $\omega_{sx}$, $\omega_{sy}$ and $\omega_{sz}$.

The variables $b_i$, $t_i$ and $h_i$ are the distances between the sensor cluster mounting location and the center of gravity of the ith occupant's upper body along the body-fixed longitudinal, lateral and vertical directions respectively. The variables $B_i$, $T_i$ and $H_i$ as the distances between the sensor cluster mounting location and the pelvic point location of the occupant seated on the seat along the body-fixed longitudinal, lateral and vertical directions, respectively. $B_i$, $T_i$ and $H_i$ can be determined from vehicle geometry, seat position and occupant classification information. Notice that, i=0,1,2,3, corresponds to the driver, the front passenger, the rear-left passenger, the rear-right passenger, respectively. $h_i$, $b_i$ and $t_i$ and can be further expressed as $$b_i = B_i + l_{bi} \sin(\theta_{bsyi} + \theta_{syi})$$

$$t_i = T_i - l_{bi} \sin(\theta_{bsxi})$$

$$h_i = H_i + l_{bi} \cos(\theta_{bsyi} + \theta_{syi}) \quad (1)$$

where $l_{bi}$ is the distance between the center of gravity of the ith occupant's upper body and the pelvic pivot point of the occupant. $l_{bi}$ is a function of the occupant's classification which is available through occupant classification sensors. These values are usually contained in look-up tables obtained through experiments. $\theta_{syi}$ is the seat back angle from the vertical, which is shown in FIG. 9. The ith occupant's body-seat separation roll angle and pitch angle are set forth as $\theta_{bsxi}$ and $\theta_{bsxyi}$.

Then the longitudinal, lateral and vertical accelerations of the ith occupant upper body center of gravity can be expressed as $$a_{xi} = a_{sx} + \omega_{sx}(\omega_{sy}t_i + \omega_{sz}h_i) - (\omega_{sy}^2 + \omega_{sz}^2)b_i + \dot{\omega}_{sy}h_i - \dot{\omega}_{sz}t_i + \omega_{sz}l_{bi}\dot{\theta}_{bsxi}$$

$$a_{yi} = a_{sy} + \omega_{sy}(\omega_{sz}h_i + \omega_{sx}b_i) - (\omega_{sz}^2 + \omega_{sx}^2)t_i + \dot{\omega}_{sz}b_i - \dot{\omega}_{sx}h_i + \omega_{sz}l_{bi}\dot{\theta}_{bsyi}$$

$$a_{zi} = a_{sz} + \omega_{sz}(\omega_{sx}b_i + \omega_{sy}t_i) - (\omega_{sx}^2 + \omega_{sy}^2)h_i + \dot{\omega}_{sx}t_i - \dot{\omega}_{sy}b_i - \omega_{sx}l_{bi}\dot{\theta}_{bsxi} - \omega_{sy}l_{bi}\dot{\theta}_{bsyi} \quad (2)$$

Notice that the angular rates experienced by the occupants are the body-seat separation angle velocities plus the vehicle angular rates measured by the various sensors within the IMU. Hence the roll and pitch angular rates of the ith occupant body can be expressed as $$\omega_{xi} = \omega_{sx} + \dot{\theta}_{bsxi}$$

$$\omega_{yi} = \omega_{sy} + \dot{\theta}_{bsyi} \quad (3)$$

The body-seat roll and pitch separation angles may be determined based on a simple body model by considering the upper body of the ith occupant. Assuming the inertial force due to human hands and the heads are negligible, then the longitudinal and lateral forces applied to the upper body from the seat can be balanced through the following equation of motion at the center of gravity of the occupant's upper body and are set forth as:

$$M_i a_{xi} = f_{xi}$$

$$M_i a_{yi} = f_{yi} \quad (4)$$

where $M_i$ denotes the mass of the upper body of the ith occupant. On the other hand, the rotational motion about the pelvic joint of the upper body follows the following simplified model $$I_{xi}\dot{\omega}_{xi} = -f_{yi}l_{bi} \cos(\theta_{bsxi}) - K_{ri}\theta_{bsxi} - D_{ri}\dot{\theta}_{bsxi}$$

$$I_{yi}\dot{\omega}_{yi} = f_{xi}l_{bi} \cos(\theta_{bsyi} + \theta_{syi}) - K_{pi}\theta_{bsyi} - D_{pi}\dot{\theta}_{bsyi} \quad (5)$$

where $I_{xi}$ and $I_{yi}$ are the occupant thorax to pelvic joint x and y moments of inertia, $K_{ri}$ and $K_{pi}$ are the occupant thorax to pelvis joint roll and pitch rotational stiffness, and $D_{ri}$ and $D_{pi}$ are the roll and pitch rotational damping coefficients at the same joint.

Substituting (3), (4) into (5) leads to the following $$I_{xi}\ddot{\theta}_{bsxi} + D_{ri}\dot{\theta}_{bsxi} + K_{ri}\theta_{bsxi} = -M_i a_{yi}l_{bi} \cos(\theta_{bsxi}) - I_{xi}\dot{\omega}_{sx}$$

$$I_{yi}\ddot{\theta}_{bsyi} + D_{pi}\dot{\theta}_{bsyi} + K_{pi}\theta_{bsyi} = M_i a_{xi}l_{bi} \cos(\theta_{bsyi} + \theta_{syi}) - I_{yi}\dot{\omega}_{sy} \quad (6)$$

A digital computation of $\theta_{bsxi}$ and $\theta_{bsxyi}$ can be obtained based on (6) as in the following $$\theta_{bsxi}(k) = \alpha_i \theta_{bsxi}(k-1) - \beta_i \theta_{bsxi}(k-2) + \gamma_i \Theta_{xi}(k) + \delta_i \Theta_{xi}(k-1)$$

$$\theta_{bsyi}(k) = \eta_i \theta_{bsyi}(k-1) - \kappa_i \theta_{bsyi}(k-2) + \lambda_i \Theta_{yi}(k) + \pi_i \Theta_{yi}(k-1) \quad (7)$$

where $\alpha_i, \beta_i, \gamma_i, \eta_i, \kappa_i, \lambda_i, \pi_i$ are coefficients which reflect the occupant body inertia characteristics and which are adjusted based on the occupant's classification, and $$\Theta_{xi}(k) = -M_i l_{bi} \cos(\theta_{bsxi}(k-1)) a_{yi}(k-1) - I_{xi}\dot{\omega}_{sx}(k)$$

$$\Theta_{yi}(k) = M_i l_{bi} \cos(\theta_{bsyi}(k-1) + \theta_{syi}(k-1)) a_{xi}(k-1) - I_{yi}\dot{\omega}_{sy}(k) \quad (8)$$

The occupant body inertia parameters can be adaptively adjusted based on the occupant classification and weight identification mechanism in the system. Certain look-up tables will be used to specify those inertia parameters which are obtained through experiments and vehicle testing.

In order to obtain the occupant's static states like the weight, weight sensors on the seat may be used. Alternately, body inertial parameters and static states can be estimated by vision based interior sensors and associated look-up tables.

Seat State Determination

The seat states include the seat backrest angles, the seat locations in the longitudinal and vertical directions, the seat states including seat belt tensions.

In FIG. 9, $\theta_{sy0}$ and $\theta_{sy1}$ are the seat backrest angles from the vertical z axis for the driver seat and the front passenger seat. The seat angles can be sensed based on the sensors used to control the seat backrest.

The seat locations (distances from a fixed point at the vehicle body) can be sensed through position sensors such as potentiometers. The front seats can be moved forward and backward, up and down through seat actuator devices. The sensed seat position can be used to calculate the distances $B_i$, $T_i$ and $H_i$ used in Equation (1).

The seatbelt tension is a function of the current in the seatbelt pretensioner motor. Denote the ith seatbelt tension in the ith seatbelt as $\tau_i$, the current in the motor of the ith seatbelt pretensioner as $v_i$, then there is a lookup table such that $$\tau_i = \text{lookup\_table}(v_i) \tag{9}$$

The lookup table can be obtained through experiments or tests. Thus calculated seatbelt tension can be used to find the required control command $u_i$ for the desired seatbelt tension as in the following $$u_i = \text{lookup\_table}^{-1}(\tau_{i-desired}) \tag{10}$$

where $\tau_{i-desired}$ is the desired tension; the inverse lookup table lookup_table$^{-1}$ is generated from the lookup table in (9). A local control loop can be used to control the current of the motor such that the desired tension can be achieved.

Occupant Dynamic Comfort Control

Figure 10:
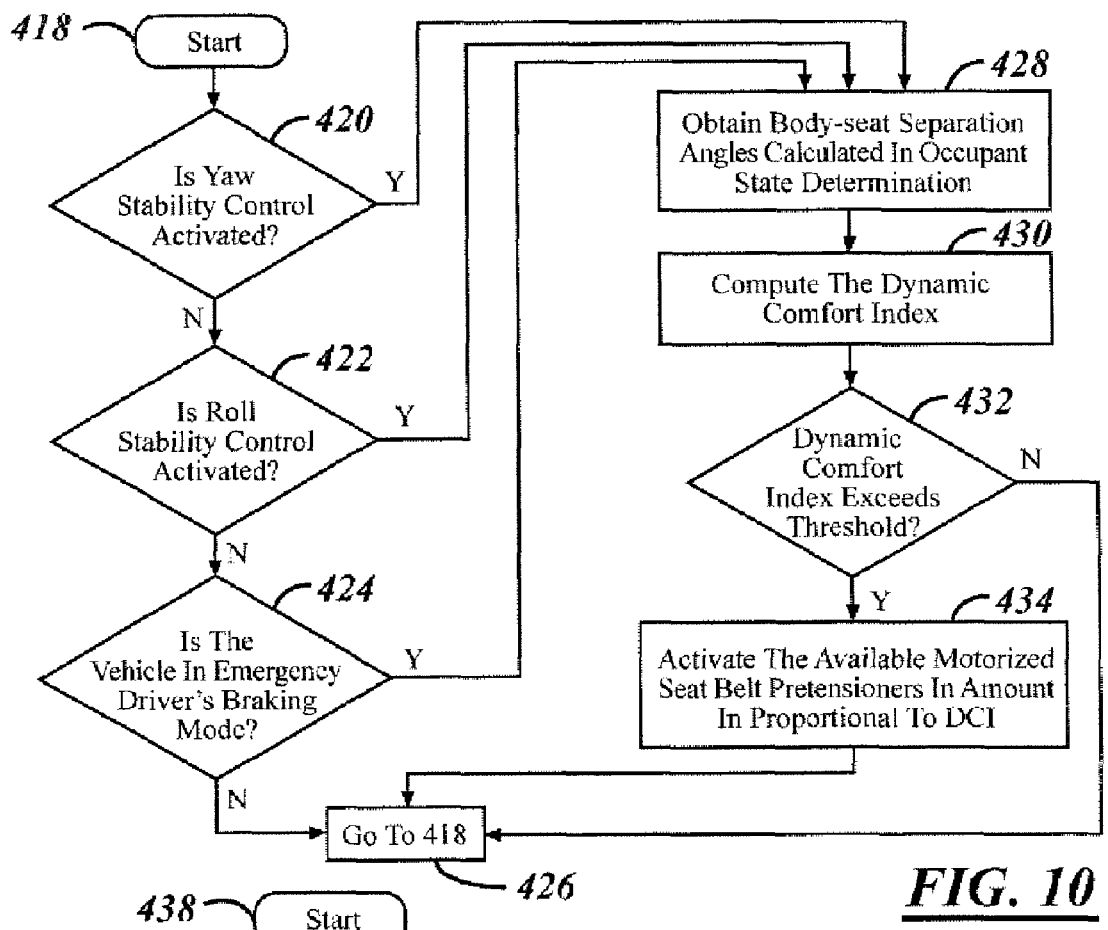
FIG. 10 is a flow chart of the occupant dynamic comfort control module.

Referring now to FIG. 10, the occupant dynamic comfort control aims to restrain the occupant's body motion with respect to the seat during vehicle dynamic control events, stability control events or emergency braking events such that the body-seat separation angles are at least minimized. That is, in step 420 it is determined whether or not the yaw stability control has been activated. If the yaw stability control has not been activated, step 422 determines whether the roll stability control has been activated. If the roll stability control has not been activated, step 424 determines whether or not the vehicle is in an emergency driver's braking mode. If the vehicle is not in a vehicle driver's braking mode the system returns to steps 420-424. In steps 420-424, if the vehicle has the yaw stability control activated or the roll stability control has been activated or the vehicle is in emergency driver's braking mode, step 428 is performed.

In step 428, the body seat separation angles are calculated in the occupant state determination. The motor control command of the pretensioners may be determined from the calculated body-seat separation roll and pitch angles $\theta_{bsxi}$ and $\theta_{bsyi}$ as in Equation (7). If the magnitudes of $\theta_{bsxi}$ and/or $\theta_{bsyi}$ are above the dynamic comfort threshold, the motor commands are set in proportion to the magnitudes of $\theta_{bsxi}$ and $\theta_{bsyi}$.

For each occupant, a dynamic comfort index (DCI) is defined, which is a function of the corresponding body-seat separation angles as set forth in step 428. That is, for the ith occupant, the dynamic comfort index might be chosen as the following (but not limited to)

$$DCI_i = \sqrt{c\theta_{bsxi}^2 + d\theta_{bsyi}^2} \tag{11}$$

where c,d are two weights which weigh the relative importance between the body-seat separation pitch and roll motions. That is, it weighs the relative importance between the braking and the lateral motion of the vehicle.

A threshold $\Gamma(v)$, which is a function of the vehicle velocity v, is used to determine when a motorized seatbelt pretensioner is going to be activated in step 432. In step 432, if the threshold is not exceeded step 426 is executed.

In step 434, if $DCI_0 > \Gamma(v)$, then the driver's pretensioner needs to be activated; if $DCI_1 > \Gamma(v)$, then the front passenger's pretensioner is adjusted; if $DCI_2 > \Gamma(v)$, the rear left passenger's pretensioner is adjusted; if $DCI_3 > \Gamma(v)$, the rear right passenger's pretensioner is adjusted. In this way the individual pretensioner control may be achieved, since during various maneuvers, each occupant could experience different body-seat separation motion.

The actuation amount for the ith pretensioner is computed as in the following $$u_i = u_0 * \text{lookup\_table}(DCI_i, \Gamma(v)) \tag{12}$$

where $u_0$ denotes the maximum available control command and the 2D lookup table used in (12) provides a weight whose value is between 0 and 1. Notice that if $DCI_i$ is below the threshold $\Gamma(v)$, the lookup table is always set to zero, while if $DCI_i$ is above another threshold value, the lookup table is set to 1.

Notice that, if $DCI_1 < \Gamma(v)$, then the ith pretensioner is reset or released.

Occupant Safety Control

Due to the progressive feature of the uncontrollable and unstable dynamics, the control command for the pretensioners might use a control command adaptively set proportional to the severity of the dangers. In this way, when the hazard is cleared, the control action is also cleared.

Figure 11:
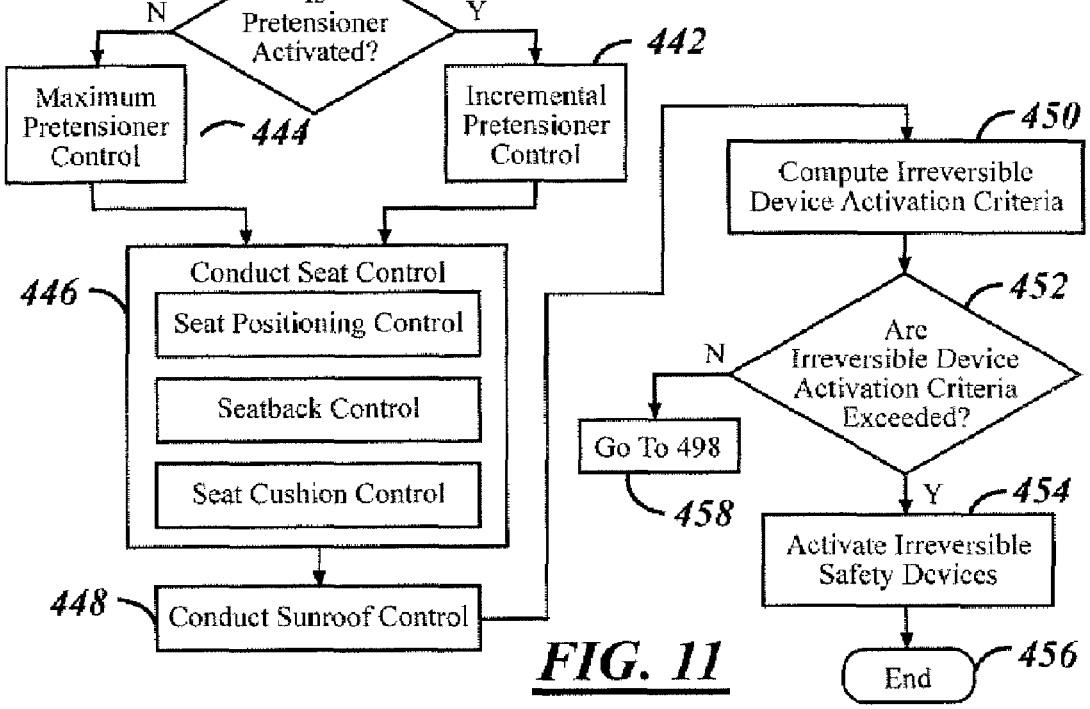
FIG. 11 is a flow chart of the occupant safety control module.

FIG. 11 describes the occupant safety control block 496 of an integrated control scheme shown FIG. 12. In step 440, if the pretensioner has been activated, step 442 is performed. More specifically, if the magnitudes of the body-seat separation roll and pitch angles $\theta_{bsxi}$ and $\theta_{bsyi}$ exceed the dynamic comfort threshold but below the safety threshold, a series of earlier stage actuation will be conducted including sending a command which is less than the allowable maximum to the pretensioner motors, or sending an incremental amount of actuation to the pretensioner on top of the ODCC actuation amount (this strategy is called Incremental Control in step 442).

In step 440 if the pretensioner has not been activated step 444 is performed. At a large severity of uncontrollable and unstable dynamics or at the external threat of a crash, the full amount of actuations will be requested for the motors in the motorized seatbelt pretensioners. Such a strategy is called a maximum control as shown in step 444.

After steps 444 or 442, step 446 is performed to conduct seat control and other actuators. Those actuators including the reversible devices like seat positioning control seatback inclination control and seat cushion control actuators. In step 448, sunroof control may be performed. In step 450 irreversible device activation criteria are determined. In step 452 if the irreversible device activation criteria is exceeded, step 454 is executed.

In step 454, the irreversible devices such as various airbags are activated. Step 456 ends the method. In step 452 if the activation criteria is not exceeded, the system returns to block 498 of FIG. 12.

Integrated Control Scheme

The integrated control scheme is shown in FIG. 12. In step 470, the integration control module determines the host vehicle states from various vehicle based sensor signals. In step 472, the external hazard sensors sense vehicle environmental states. In steps 474 and 476 the occupant states and the seat states are respectively determined.

The method also checks the vehicle's dynamic state in step 478. If the vehicle dynamics are not stable the necessary stability control functions are initiated in step 480. If the stability control or emergency braking is initiated in step 480, the integration scheme determines the occupant's dynamic comfort index. If such an index exceeds the first threshold in step 482, the occupant dynamics comfort control function will be activated in step 484. If the dynamics comfort index threshold was not exceeded in step 482, step 486 is executed.

In step 486, if the integration scheme further determines that the vehicle is still in an unstable mode regardless of the activation of the stability control system, a maximum control strategy for the stability control system is initiated (i.e., the maximum control amount is requested for actuators which are performing the stability control) in step 488, and at the same time, the occupant safety control is also initiated in step 496.

In step 492 the external hazard is checked if the unstable dynamics thresholds are not exceeded in step 486 or if the vehicle dynamics are stable in step 478. If no external hazard above a threshold exists in step 494, step 470 is executed. If the external hazard level exists above a threshold in step 494, step 496 is performed. The functioning of block 496 is already described in details with reference to FIG. 11 above.

The external hazard condition is reassessed in block 498. If the external hazard is above a threshold value, the control is transferred back to block 496. The integration scheme will give priority to response to the external hazard and the occupant safety control is initiated immediately regardless of other actuations. In step 498, if the external hazard is not above a threshold value the control is transferred to block 500 where it is assessed whether the vehicle dynamics are exceeding a second threshold value. If the vehicle dynamics threshold values are exceeded the control is transferred back to block 488 otherwise the control is transferred to block 502. In block 502, the actuation of reversible actuators is released and the control goes back to the beginning of the scheme at block 470.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle, said control system comprising:
 a plurality of dynamics sensors for generating a plurality of dynamic condition signals that are indicative of dynamic conditions onboard said automotive vehicle;
 a plurality of environment sensors for generating a plurality of environmental condition signals that are indicative of environmental conditions about said automotive vehicle;
 a vehicle system; and
 a controller coupled to said plurality of dynamics sensors, said plurality of environment sensors, and said vehicle system;
 wherein said controller is operable to process both said dynamic condition signals and said environmental condition signals so as to determine an operational state of said automotive vehicle and also detect an external hazard about said automotive vehicle;
 wherein said controller is operable to classify the operational dynamics of said automotive vehicle as being stable and controllable, unstable but controllable, or unstable and uncontrollable according to said operational state as determined and any said external hazard as detected; and
 wherein said controller is operable to select a level of control based on said operational dynamics of said automotive vehicle as classified and accordingly provide control signals to said vehicle system for thereby operating said vehicle system at said level of control.

2. A control system as set forth in claim 1, wherein said controller comprises a vehicle dynamics control module.

3. A control system as set forth in claim 1, wherein said controller is operable to determine said operational dynamics and classify said operational dynamics in response to and in accordance with said operational state.

4. A control system as set forth in claim 3, wherein said controller is operable to determine said operational state in response to and in accordance with a vehicle state.

5. A control system as set forth in claim 4, wherein said vehicle state is determined in response to and in accordance with a vehicle attitude and a directional velocity.

6. A control system as set forth in claim 4, wherein said vehicle state is determined in response to and in accordance with a normal loading and a directional velocity.

7. A control system as set forth in claim 4, wherein said vehicle state is determined in response to and in accordance with a force and torque estimation.

8. A control system as set forth in claim 3, wherein said controller is operable to determine said operational state in response to and in accordance with a road state.

9. A control system as set forth in claim 8, wherein said road state is determined in response to and in accordance with a road bank determination or a road inclination determination.

10. A control system as set forth in claim 8, wherein said road state is determined in response to and in accordance with (i) a road bank determination or a road inclination determination, (ii) a surface friction determination, and (iii) a road curvature determination.

11. A control system as set forth in claim 3, wherein said controller is operable to determine said operational state in response to and in accordance with a driver intention determination.

12. A control system as set forth in claim 3, wherein said controller is operable to determine said operational state in response to and in accordance with a dominated dynamics determination of a dynamic control direction of said vehicle.

13. A control system as set forth in claim 1, wherein said controller is operable to generate a vehicle state, a road state, and a driver intention determination and also classify said operational dynamics in response to and in accordance with said vehicle state, said road state, and said driver intention determination.

14. A control system as set forth in claim 1, wherein said controller is operable to generate an external hazard determination and also classify said operational dynamics in response to and in accordance with said external hazard determination.

15. A control system as set forth in claim 14, wherein said external hazard determination is generated in response to and in accordance with a moving object classification, an accident avoidance determination, or a pre-crash determination.

16. A control system as set forth in claim 1, wherein said controller is operable to generate a plurality of stability indices and also classify said operational dynamics in response to and in accordance with said plurality of stability indices.

17. A control system as set forth in claim 1, wherein said vehicle system comprises a chassis control module.

18. A control system as set forth in claim 17, wherein said chassis control module is adapted for being coupled to at least one of a traction control system, a suspension height control system, a seat feel control system, a body attitude and motion control system, and a steering control system.

19. A control system as set forth in claim 1, wherein said vehicle system comprises a powertrain control module.

20. A control system as set forth in claim 1, wherein said vehicle system comprises a restraint control module.

21. A control system as set forth in claim 1, wherein said vehicle system comprises a driver warning system.

22. A method of controlling a vehicle, said method comprising the steps of:
   sensing dynamic conditions aboard said vehicle;
   sensing environmental conditions about said vehicle;
   determining an operational state of said vehicle based on said dynamic conditions and said environmental conditions as sensed;
   determining an intent of a driver aboard said vehicle;
   detecting an external hazard about said vehicle based on said dynamic conditions and said environmental conditions as sensed;
   in accordance with said operational state of said vehicle as determined, said intent of said driver as determined, and any said external hazard as detected, classifying the operational dynamics of said vehicle as stable and controllable, unstable but controllable, or unstable and uncontrollable;
   selecting a level of control based on said operational dynamics of said vehicle as classified; and
   accordingly providing control signals to a vehicle system so as to thereby operate said vehicle system at said level of control.

23. A method as set forth in claim 22, wherein said control signals include a warning signal.

24. A method as set forth in claim 22, wherein said vehicle system comprises a chassis control module.

25. A method as set forth in claim 24, wherein said chassis control module is adapted for being coupled to a traction control system (TCS).

26. A method as set forth in claim 24, wherein said chassis control module is adapted for being coupled to a suspension height control system.

27. A method as set forth in claim 24, wherein said chassis control module is adapted for being coupled to a seat feel control system.

28. A method as set forth in claim 22, wherein said vehicle system comprises a powertrain control module.

29. A method as set forth in claim 22, wherein said vehicle system comprises a restraint control module.

30. A method as set forth in claim 22, wherein said vehicle system comprises a seatbelt pretensioner.

31. A method as set forth in claim 24, wherein said chassis control module is adapted for being coupled to a steering control system.

32. A method as set forth in claim 24, wherein said chassis control module is adapted for being coupled to a body attitude and motion control system.

33. A method as set forth in claim 30, said method further comprising the step of:
   determining a dynamic comfort index (DCI) for an occupant aboard said vehicle;
   wherein said control signals provided to said seatbelt pretensioner are at least partially generated in response to and in accordance with said dynamic comfort index.

34. A method of controlling a pretensioner for a seatbelt aboard a vehicle having a seat for an occupant, said method comprising the steps of:
   determining a static state of said occupant aboard said vehicle;
   determining a dynamic state of said occupant aboard said vehicle;
   determining an angled state of a backrest portion of said seat aboard said vehicle;
   determining a locational state of a bottom portion of said seat aboard said vehicle;
   determining a tensional state of said seatbelt aboard said vehicle;
   during an active vehicle-control event aboard said vehicle, accordingly determining at least one separation angle between said seat and a body of said occupant;
   accordingly determining a dynamic comfort index (DCI) for said occupant as a function of said at least one separation angle; and
   activating said pretensioner for said seatbelt according to said dynamic comfort index as determined.

* * * * *